US012663070B2

(12) United States Patent
Tsuchida

(10) Patent No.: US 12,663,070 B2
(45) Date of Patent: Jun. 23, 2026

(54) POWER TRANSMISSION DEVICE INCLUDING COMMUNICATION PATH BETWEEN FIRST AND SECOND CHAMBERS

(71) Applicants: JATCO LTD, Fuij-shi (JP); Nissan Motor Co., Ltd., Yokohama-shi (JP)

(72) Inventor: Akira Tsuchida, Sagamihara (JP)

(73) Assignees: JATCO LTD, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/846,924

(22) PCT Filed: Mar. 23, 2023

(86) PCT No.: PCT/JP2023/011607
§ 371 (c)(1),
(2) Date: Sep. 13, 2024

(87) PCT Pub. No.: WO2023/182444
PCT Pub. Date: Sep. 28, 2023

(65) Prior Publication Data
US 2025/0198503 A1 Jun. 19, 2025

(30) Foreign Application Priority Data
Mar. 23, 2022 (JP) ................................ 2022-047603

(51) Int. Cl.
*F16H 57/04* (2010.01)
(52) U.S. Cl.
CPC ..... *F16H 57/0435* (2013.01); *F16H 57/0439* (2013.01); *F16H 57/0453* (2013.01)

(58) Field of Classification Search
CPC ............ F16H 57/0435; F16H 57/0439; F16H 57/045; F16H 57/0453
See application file for complete search history.

(56) References Cited

U.S. PATENT DOCUMENTS

| 9,845,869 B2 * | 12/2017 | Shirasaka | ........... F16H 61/0031 |
| 10,371,254 B2 * | 8/2019 | Fukui | .................. F16H 57/0439 |

(Continued)

FOREIGN PATENT DOCUMENTS

| JP | S58-070557 U1 | 5/1983 |
| JP | 2013-019432 A | 1/2013 |
| JP | 2015-045401 A | 3/2015 |

*Primary Examiner* — Minh Truong
(74) *Attorney, Agent, or Firm* — Spencer Fane LLP

(57) ABSTRACT

A power transmission device for a vehicle includes a housing that accommodates a power transmission mechanism, a control valve configured to control an oil pressure supplied to the power transmission mechanism, an oil pump configured to supply oil to the control valve, a partition section that divides an interior of the housing into a first chamber that accommodates the power transmission mechanism and a second chamber in which the control valve is arranged upright, and a communication path communicating between the first chamber and the second chamber. An opening area of the communication path is set so that an amount of the oil flowing from the second chamber into the first chamber through the communication path is less than an amount of the oil drained into the second chamber from the control valve while the vehicle is in motion.

14 Claims, 11 Drawing Sheets

(56) References Cited

U.S. PATENT DOCUMENTS

2008/0169030 A1* 7/2008 Schoenek ........... F16H 57/0447
                                                     137/434
2016/0281842 A1    9/2016 Fukui et al.
2017/0292602 A1* 10/2017 Chen ................... F16H 57/0405

* cited by examiner

POWER TRANSMISSION DEVICE INCLUDING COMMUNICATION PATH BETWEEN FIRST AND SECOND CHAMBERS

CROSS-REFERENCE TO RELATED APPLICATIONS

This application is a U.S. national stage application of International Application No. PCT/JP2023/011607, filed on Mar. 23, 2023. This application also claims priority to Japanese Patent Application No 2022-047603, filed on Mar. 23, 2022.

BACKGROUND

Technical Field

The present invention relates to a power transmission device.

Background Information

Japanese Patent Laid-Open Publication No. 2015-045401 discloses a drive device for a vehicle.

SUMMARY

In this drive device, a drive mechanism that operates using oil pressure is provided inside a housing.
Oil used for the operation and lubrication of the drive mechanism is collected in a bottom section inside the housing.
If the height of the oil (oil level) inside the housing is high, the oil OL acts as resistance to the rotation of rotating bodies that constitute the drive mechanism (power transmission mechanism).
Thus, there is a need to reduce the resistance of oil acting on the power transmission mechanism.
One aspect of the present disclosure is a power transmission device for a vehicle, comprising a housing that accommodates a power transmission mechanism, a control valve that controls the oil pressure supplied to the power transmission mechanism, an oil pump that supplies oil to the control valve, a partition section that divides the interior of the housing into a first chamber that accommodates the power transmission mechanism and a second chamber in which the control valve is disposed upright, and a communication path communicating between the first chamber and the second chamber, wherein the opening area of the communication path is set so that the amount of oil flowing from the second chamber into the first chamber through the communication path is less than the amount of oil drained into the second chamber from the control valve while the vehicle is in motion.
Another aspect of the present disclosure is a power transmission device for a vehicle, comprising a housing that accommodates a power transmission mechanism, a control valve that controls the oil pressure supplied to the power transmission mechanism, an oil pump that supplies oil to the control valve, a partition section that divides the interior of the housing into a first chamber that accommodates the power transmission mechanism and a second chamber in which the control valve is arranged upright, a flow path for oil supplied from the first chamber to the control valve, and a communication path communicating between the first chamber and the second chamber, wherein the cross-sectional area of the flow path is greater than the opening area of the communication path.
In one aspect of the present disclosure, the resistance of oil used in a power transmission mechanism can be reduced.

BRIEF DESCRIPTION OF THE DRAWINGS

Referring now to the attached drawings which form a part of this original disclosure.

DETAILED DESCRIPTION

Figure 1:
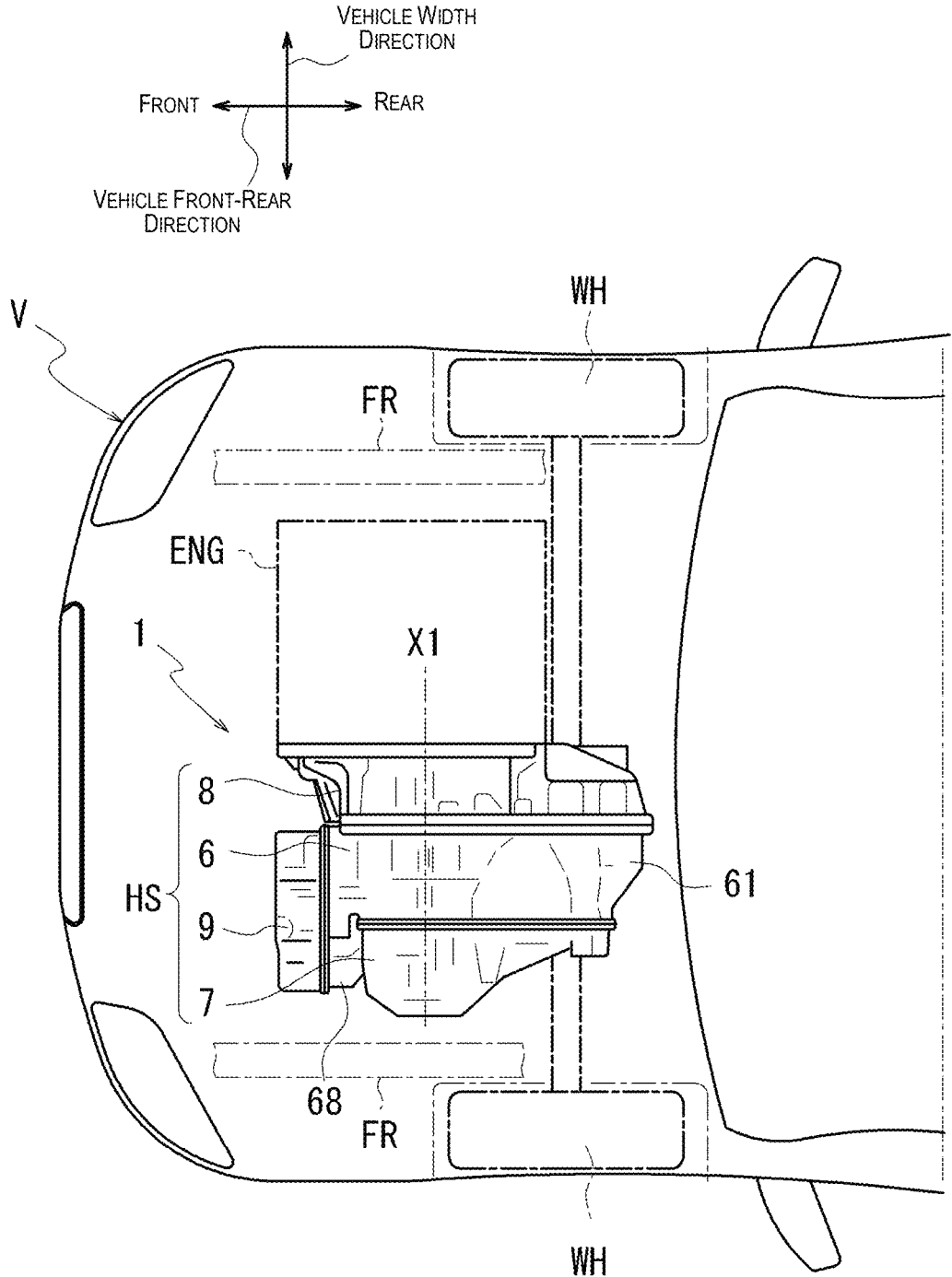
FIG. 1 is a schematic diagram illustrating the arrangement of a power transmission device in a vehicle.

First, definitions of terminology in the present specification will be explained.
A power transmission device is a device having at least a power transmission mechanism, where the power transmission mechanism is, for example, at least one of a gear mechanism, a differential gear mechanism, or a reduction gear mechanism.
In the following embodiment, a case is illustrated in which a power transmission device 1 has a function for transmitting the output rotation of an engine, but the power transmission device 1 need only transmit the output rotation of at least one of an engine or a motor (rotating electrical machine).
"Overlaps as viewed from a prescribed direction" means that a plurality of elements are arranged in a prescribed direction, and means the same as "overlapping in a prescribed direction." "Prescribed direction" is, for example, the axial direction, radial direction, direction of gravity, direction of travel of the vehicle (vehicle forward travel direction, vehicle rearward travel direction), etc.
If a plurality of elements (parts, sections, etc.) are shown arranged in a prescribed direction in the drawings, it may be assumed that there is text in the description in the specification indicating that the plurality of elements overlap when viewed in the prescribed direction.

"Not overlapping when viewed in a prescribed direction" and "offset when viewed in a prescribed direction" mean that a plurality of elements are not arranged in the prescribed direction, and mean the same as "not overlapping in a prescribed direction" and "offset in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown not arranged in a prescribed direction in the drawings, it may be assumed that there is text in the description in the specification indicating that the plurality of elements do not overlap when viewed in the prescribed direction.

"As viewed from a prescribed direction, a first element (part, section, etc.) is located between a second element (part, section, etc.) and a third element (part, section, etc.)" means that when viewed from the prescribed direction, the first element can be seen between the second element and the third element. The "prescribed direction" is, for example, the axial direction, radial direction, direction of gravity, direction of travel of the vehicle (forward movement direction of the vehicle, rearward movement direction of the vehicle), etc.

For example, if the second element, the first element, and the third element are arranged in that order in the axial direction, then the first element is located between the second element and the third element when viewed from the radial direction. If the first element is shown between the second element and the third element as viewed from a prescribed direction in the drawings, it may be assumed that there is text in the description in the specification describing the first element between the second element and the third element as viewed from the prescribed direction.

When two elements (parts, sections, etc.) overlap as viewed from the axial direction, the two elements are coaxial.

"Axial direction" means the axial direction of the axis of rotation of a part making up the device. "Radial direction" means a direction orthogonally intersecting the axis of rotation of the part making up the device. The part is, for example, a motor, a gear mechanism, a differential gear mechanism, or the like.

"The downstream side in the direction of rotation" means the downstream side in the direction of rotation when the vehicle is advancing or the direction of rotation during vehicle forward movement or during vehicle backward movement. It is appropriate to assume the downstream side in the direction of rotation is during vehicle forward movement, which is frequently the case.

"Upright" with reference to the control valve means that in the case of a control valve having a basic configuration with a separation plate sandwiched between valve bodies, the valve bodies of the control valve are stacked in the horizontal line direction based on the state of installation of the power transmission device in the vehicle. The "horizontal line direction" here does not mean the horizontal line direction in the strict sense, but also includes cases in which the direction of stacking is at an angle relative to the horizontal line.

Further, "upright" with respect to the control valve means that the control valve is arranged with the plurality of pressure regulating valves inside the control valve aligned in the direction of a vertical line VL based on the state of installation of the power transmission device in the vehicle.

"The plurality of pressure regulating valves aligned in the direction of a vertical line VL" means that the regulating valves inside the control valve are arranged spaced out in the direction of the vertical line VL.

In this case, the plurality of pressure regulating valves need not be strictly arranged in single file in the direction of the vertical line VL.

For example, if the plurality of valve bodies are stacked to form the control valve, the following is possible. Namely, the plurality of pressure regulating valves may be arranged in the direction of the vertical line VL with shifted positions in the direction of stacking of the valve bodies in the upright control valve.

Further, as viewed from the axial direction of the valve bodies provided on the pressure regulating valves (the direction of forward and backward movement), the plurality of pressure regulating valves need not be arranged with gaps in between in the direction of the vertical line VL.

As viewed from the axial direction of the valve bodies provided with the pressure regulating valves (the direction of forward and backward movement), the plurality of pressure regulating valves need not be adjacent in the direction of the vertical line VL.

Hence, if, for example, the pressure regulating valves arranged in the direction of the vertical line VL are arranged with shifted positions in the stacking direction (horizontal line direction) of the valve bodies, then cases are also included in which, as viewed from the stacking direction, the pressure regulating valves that are adjacent in the direction of the vertical line VL are provided in a partially overlapping positional relationship.

Further, that the control valve is "upright" means that the plurality of pressure regulating valves inside the control valve are arranged in the direction of movement of the valve bodies (spool valves) provided in the pressure regulating valves aligned in the horizontal line direction.

The direction of movement of the valve bodies (spool valves) in this case is not limited to the horizontal line direction in the strict sense. The direction of movement of the valve bodies (spool valves) in this case is a direction along an axis of rotation X of the power transmission device. In this case, the direction of the axis of rotation X and the sliding direction of the valve bodies (spool valves) are the same.

An embodiment of the present disclosure is described below.

FIG. 1 is a schematic diagram illustrating the arrangement of a power transmission device 1 in a vehicle V.

Figure 2:
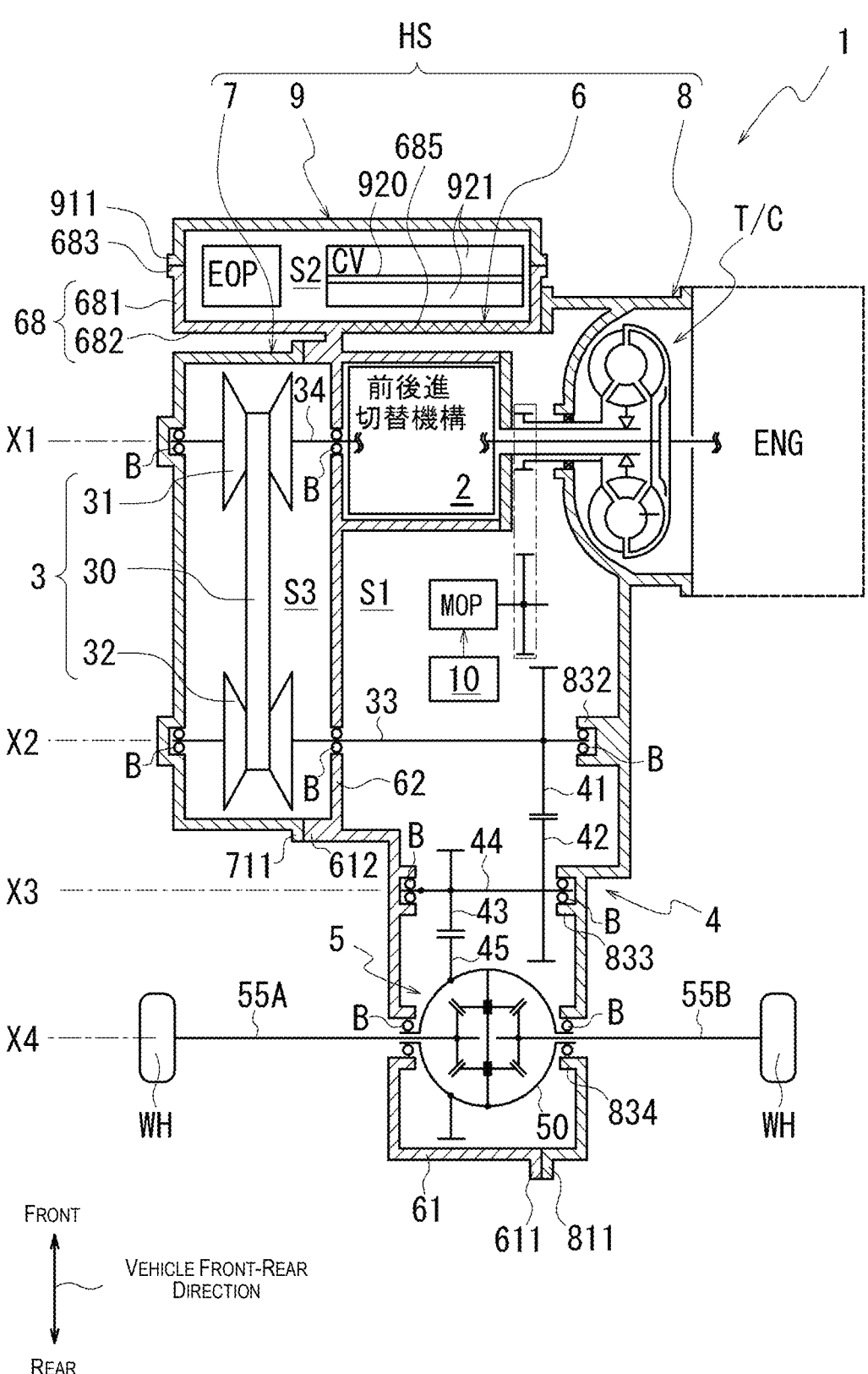
FIG. 2 is a schematic diagram illustrating a general configuration of the power transmission device.

FIG. 2 is a schematic diagram illustrating a general configuration of the power transmission device 1.

As shown in FIG. 1, the power transmission device 1 in the front of the vehicle V is arranged between left and right frames FR, FR. A housing HS of the power transmission device 1 is configured by a case 6, a first cover 7, a second cover 8, and a third cover 9.

As shown in FIG. 2, the interior of the housing HS accommodates a torque converter T/C, a forward-reverse switching mechanism 2, a variator 3, a reduction mechanism 4, a differential drive device 5, an electronic oil pump EOP, a mechanical oil pump MOP, a control valve CV, etc.

In the power transmission device 1, output rotation of an engine ENG (the drive source) is input into the forward-reverse switching mechanism 2 via the torque converter T/C.

The rotation input to the forward-reverse switching mechanism 2 is forward rotation or reverse rotation and is input to a primary pulley 31 of the variator 3.

In the variator 3, changing the winding radius of a belt 30 in the primary pulley 31 and a secondary pulley 32 causes the rotation input to the primary pulley 31 to be shifted at a desired gear ratio and output by an output shaft 33 of the secondary pulley 32.

Output rotation of the secondary pulley 32 is input via the reduction mechanism 4 into the differential drive mechanism 5 (differential gear mechanism) and is then transmitted to drive wheels WH, WH via left and right drive shafts 55A, 55B.

The reduction mechanism 4 has an output gear 41, an idler gear 42, a reduction gear 43, and a final gear 45.

The output gear 41 rotates together with the output shaft 33 of the secondary pulley 32.

The idler gear 42 meshes with the output gear 41 in a manner allowing transmission of rotation. The idler gear 42 is spline-fitted to an idler shaft 44 and rotates together with the idler shaft 44. The idler shaft 44 is provided with the reduction gear 43 that has a smaller radius than the idler gear 42. The reduction gear 43 meshes with the final gear 45 that is fixed to the outer circumference of a differential case 50 of the differential device 5 in a manner allowing transmission of rotation.

In the power transmission device 1, the forward-reverse switching mechanism 2, the torque converter T/C, and the output shaft of the engine ENG are arranged coaxially (concentrically) along an axis of rotation X1 (first axis) of the primary pulley 31.

The output shaft 33 of the secondary pulley 32 and the output gear 41 are arranged coaxially along an axis of rotation X2 (second axis) of the secondary pulley 32.

The idler gear 42 and the reduction gear 43 are arranged coaxially along a common axis of rotation X3.

The final gear 45 and the drive shafts 55A, 55B are arranged coaxially on a common axis of rotation X4. In the power transmission device 1, the axes of rotation X1-X4 are set to have a positional relationship parallel to each other. In the following, these axes of rotation X1-X4 may, as needed, be referred to as the axis of rotation X of the power transmission device 1 (power transmission mechanism).

Figure 3:
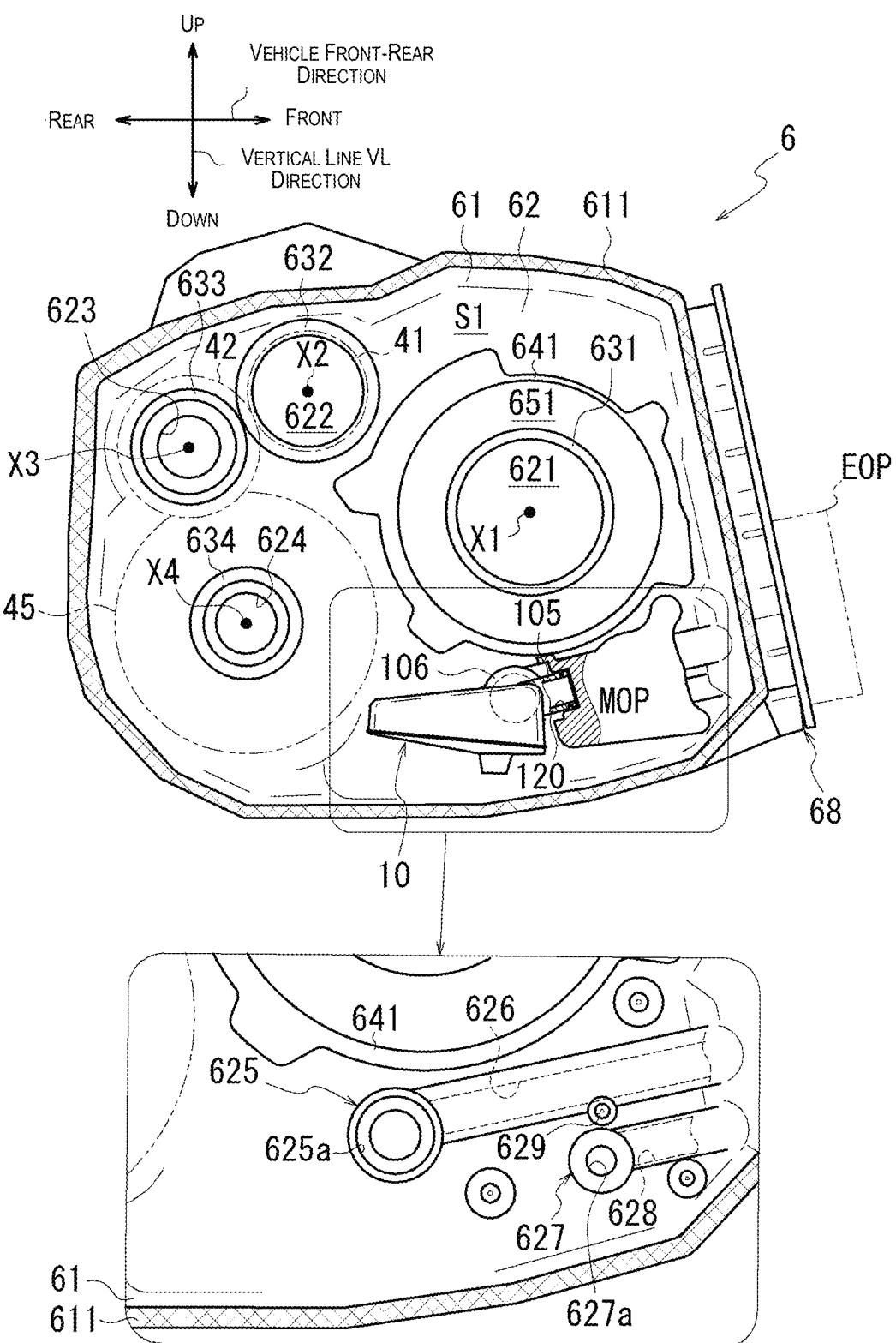
FIG. 3 is a schematic diagram illustrating a case from a second cover side.

FIG. 3 is a schematic diagram illustrating the case 6 viewed from the second cover 8 side. Note that in the enlarged view in FIG. 3, the strainer 10 and the mechanical oil pump MOP are left out, and the areas around connecting sections 625, 627 provided in the partition section 62 are shown.

As shown in FIG. 3, the case 6 has a cylindrical circumferential wall section 61 and a partition section 62. A housing section 68 that forms a second chamber S2, which will be discussed below, is attached to the outer circumference of the circumferential wall section 61 on the side toward the front of the vehicle.

The partition section 62 is provided within a range cutting across the axes of rotation (axis of rotation X1-axis of rotation X4) of the power transmission mechanism.

As shown in FIG. 2, the partition section 62 divides the space inside the circumferential wall section 61 in two in the direction of the axis of rotation X1. One side of the partition section 62 in the direction of the axis of rotation X1 is a first chamber S1, and the other side is a third chamber S3.

The first chamber S1 accommodates the forward-reverse switching mechanism 2, the reduction mechanism 4, and the differential mechanism 5. The third chamber S3 accommodates the variator 3.

In the case 6, an opening on the first chamber S1 side is sealed by the second cover 8 (torque converter cover). An opening on the third chamber S3 side is sealed by the first cover 7 (side cover).

In the case 6, oil used for operation of the power transmission device 1 or lubrication of component elements of the power transmission device 1 is collected below the space between the first cover 7 and the second cover 8 (the first chamber S1 and the third chamber S3).

As shown in FIG. 3, the end surface of the case 6 facing the second cover 8 side (toward the viewer) is a joining section 611 with the second cover 8. The joining section 611 is a flanged section surrounding the entire opening of the partition section 62 facing the second cover 8. A joining section 811 (see FIG. 2) on the second cover 8 side is joined to the entire circumference of the joining section 611. The case 6 and the second cover 8 are connected by bolts, not shown, to join the joining sections 611, 811 together. The opening of the case 6 is thus held in a state sealed by the second cover 8, forming the closed first chamber S1.

As shown in FIG. 3, in the case 6, the partition section 62 is located inside the joining section 611.

The partition section 62 of the case 6 is provided in a direction essentially orthogonal to the axis of rotation (axes of rotation X1-X4). Through-holes 621, 622, 624 and a support hole 623 are formed in the partition section 62.

The through-hole 621 is formed around the axis of rotation X1. A cylindrical support wall section 631 surrounding the through-hole 621 and a circumferential wall section 641 surrounding the outer circumference of the cylindrical support wall section 631 with a space in between are provided in the surface of the partition section 62 facing the first chamber S1 (toward the viewer). The cylindrical support wall section 631 and the circumferential wall section 641 project toward the viewer in FIG. 3 (toward the second cover 8 in FIG. 2).

A region 651 between the cylindrical support wall section 631 and the circumferential wall section 641 is a cylindrical space accommodating a piston (not shown) of the forward-reverse switching mechanism 2, friction plates (forward clutch, reverse clutch), etc.

An input shaft 34 (see FIG. 2) of the primary pulley 31 is rotatably supported on the inner circumference of the cylindrical support wall section 631 via bearings B.

As shown in FIG. 3, the through-hole 622 is formed around the axis of rotation X2.

In the power transmission device 1 mounted in the vehicle V, the axis of rotation X2 is positioned diagonally above toward the rear of the vehicle as viewed from the axis of rotation X1.

A cylindrical support wall section 632 that surrounds the through-hole 622 is provided in the surface of the partition section 62 facing the first chamber S1 (toward the viewer). An output shaft 33 (see FIG. 2) of the secondary pulley 32 is rotatably supported on the inner circumference of the cylindrical support wall section 631 via the bearings B.

As shown in FIG. 3, the support hole 623 is a hole closed at one end formed around the axis of rotation X3.

In the power transmission device 1 mounted in the vehicle V, the axis of rotation X3 is positioned diagonally above toward the rear of the vehicle as viewed from the axis of rotation X1 and diagonally below toward the rear of the vehicle as viewed from the axis of rotation X2.

A cylindrical support wall section 633 that surrounds the support hole 623 is provided in the surface of the partition section 62 facing the first chamber S1 (toward the viewer). One end of the idler shaft 44 (see FIG. 2) of the reduction mechanism 4 is rotatably supported on the inner circumference of the support wall section 633 via the bearings B.

As shown in FIG. 3, the through-hole 624 is formed around the axis of rotation X4.

In the power transmission device 1 mounted in the vehicle V, the axis of rotation X4 is positioned diagonally below toward the rear of the vehicle as viewed from the axis of rotation X1, diagonally below toward the rear of the vehicle as viewed from the axis of rotation X2, and diagonally below toward the front of the vehicle as viewed from the axis of rotation X3.

A cylindrical support wall section 634 that surrounds the through-hole 624 is provided in the surface of the partition section 62 facing the first chamber S1 (toward the viewer). The differential case 50 (see FIG. 2) of the differential device 5 is rotatably supported in the inner circumference of the support wall section 634 via the bearings B.

As shown in FIG. 2, the final gear 45, in the form of a ring as viewed from the direction of the axis of rotation X4, is fixed to the outer circumference of the differential case 50. The final gear 45 rotates about the axis of rotation X4 together with the differential case 50.

In the case 6 shown in FIG. 3, a strainer 10 is disposed in a region below the circular circumferential wall section 641 and farther toward the front of the vehicle than the final gear 45.

A connection section 625 with the strainer 10 and a connection section 627 with the mechanical oil pump MOP are provided in the partition section 62 as shown in FIG. 3. The connection sections 625, 627 are positioned below the circumferential wall section 641. A connection port 625a of the connection section 625 and a connection port 627a of the connection section 627 open in the same direction. The connection port 625a of the connection section 625 communicates with an oil path 626 provided in the partition section 62. The connection port 627a of the connection section 627 communicates with an oil path 628 provided in the partition section 62.

The oil paths 626, 628 extend in straight lines toward the housing section 68 (to the right in the diagram) inside the partition section 62. The oil path 626 connects to the electric oil pump EOP (see FIG. 2) housed in the housing section 68. The oil path 628 connects to the control valve CV (see FIG. 2) installed in the housing section 68.

Figure 4:
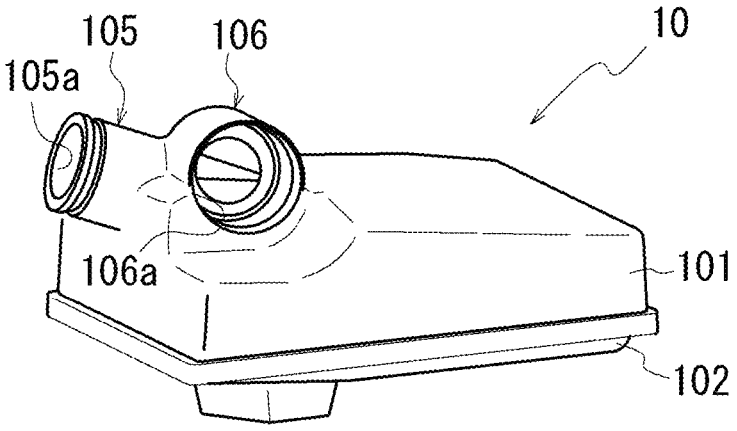
FIG. 4 is a perspective view of a strainer.

FIG. 4 is a perspective view of the strainer 10 viewed from diagonally above an upper case 101.

Figure 5:
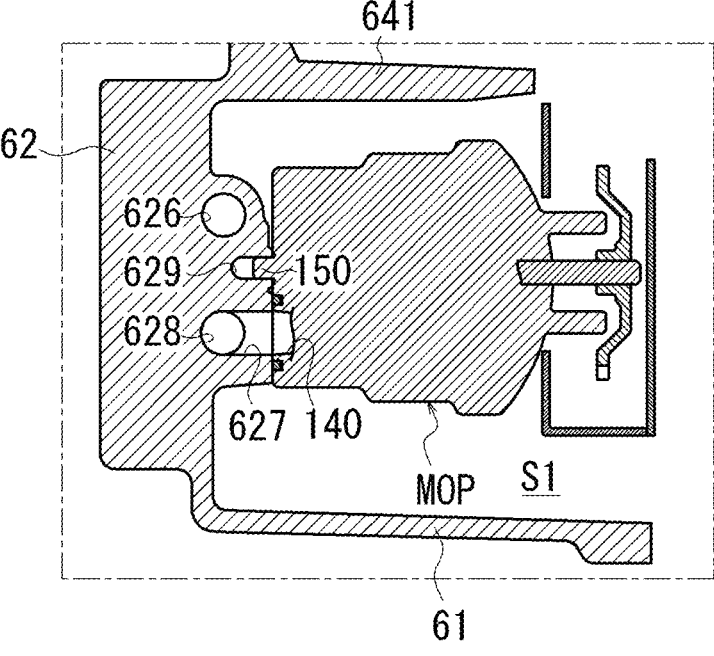
FIG. 5 is a diagram illustrating support using a partition section in a mechanical oil pump.

FIG. 5 is a diagram illustrating a support structure of the mechanical oil pump MOP in the partition section 62.

As shown in FIG. 4, the strainer 10 has a basic structure in which a filter (not shown) is arranged inside a space between the upper case 101 and a lower case 102.

A first connection section 105 and a second connection section 106 are provided in the upper case 101 of the strainer 10.

The first connection section 105 is a connection section with the mechanical oil pump MOP. The first connection section 105 extends from the upper case 101 in a direction approaching the mechanical oil pump MOP (see FIG. 3).

The end of the first connection section 105 is inserted into a connection port 120 on the mechanical oil pump MOP when the strainer 10 is connected to the mechanical oil pump MOP (see FIG. 3).

As shown in FIG. 4, the second connection section 106 is provided at the base of the first connection section 105. The direction in which an oil path 106a inside the second connection section 106 opens is orthogonal to the direction in which an oil path 105a in the first connection section 105 opens.

In the present embodiment, the strainer 10 is attached to the partition section 62 of the case 6 already assembled to the mechanical oil pump MOP. The oil path 106a opens toward the direction in which the mechanical oil pump MOP is attached to the partition section 62 (the left-right direction in FIG. 5).

In the present embodiment, once the mechanical oil pump MOP is fully attached to the partition section 62, the second connection section 106 is connected to a connection section 625 (see FIG. 3) in the partition section 62.

In this state, the strainer 10 communicates with the oil path 626 inside the partition section via the oil path 106a inside the second connection section 106. The oil path 626 communicates with the electric oil pump EOP, as mentioned above. Therefore, when the electric oil pump EOP is driven, the oil OL collected in the bottom of the housing HS is suctioned toward the electric oil pump EOP via the oil path 626 of the strainer 10.

Further, as shown in FIG. 5, the mechanical oil pump MOP is positioned in a prescribed position on the partition section 62 by inserting a protrusion 150 into an insertion hole 629 in the partition section 62. In this state, a discharge port 140 of the mechanical oil pump MOP is arranged in a position facing the connection section 627 of the partition section 62, and the discharge port 140 and the connection section 627 communicate. The connection section 627 communicates with the oil path 628 inside the partition section 62.

Therefore, when the mechanical oil pump MOP is driven, the oil OL collected in the bottom of the housing HS is suctioned by the mechanical oil pump MOP via the strainer 10. The oil OL suctioned by the mechanical oil pump MOP is pressurized and discharged through the discharge port 140 into the connection section 627. The oil OL passes through the oil path 628 that is connected to the connection section 627 and is supplied to the control valve CV.

Thus, in the present embodiment, the strainer 10 is shared by the electric oil pump EOP and the mechanical oil pump MOP.

As shown in FIG. 2, the housing section 68 is attached to the side surface of the case 6 toward the front of the vehicle.

The housing section 68 is provided with the opening facing the front of the vehicle. The housing section 68 is arranged in the direction along the axis of rotation X1. As viewed from the radial direction of the axis of rotation X1, the housing section 68 is formed having a range in the direction of the axis of rotation X1 from the region of the circumferential wall section 61 of the case 6 to the side of the first cover 7.

A region of approximately half of the bottom wall section 682 of the housing section 68 on the engine ENG side is integrated with the circumferential wall section 61. The region of approximately half of the opposite side of the bottom wall section 682 is an extension of the circumferential wall section 61, with a gap formed with the outer circumference of the first cover 7.

In the following description, the region of the bottom wall section 682 that is integral with the circumferential wall section 61 (the region that is shared with the circumferential wall section 61) is, as needed, referred to as a dividing wall 685. When referred to as the dividing wall 685, this indicates the region of the bottom wall section 682 shown in FIG. 6 that overlaps the circumferential wall section 61 of the case 6.

Note that in FIG. 2, crosshatching is applied to the region of the dividing wall 685 in order to clearly distinguish the region of the dividing wall 685.

Figure 6:
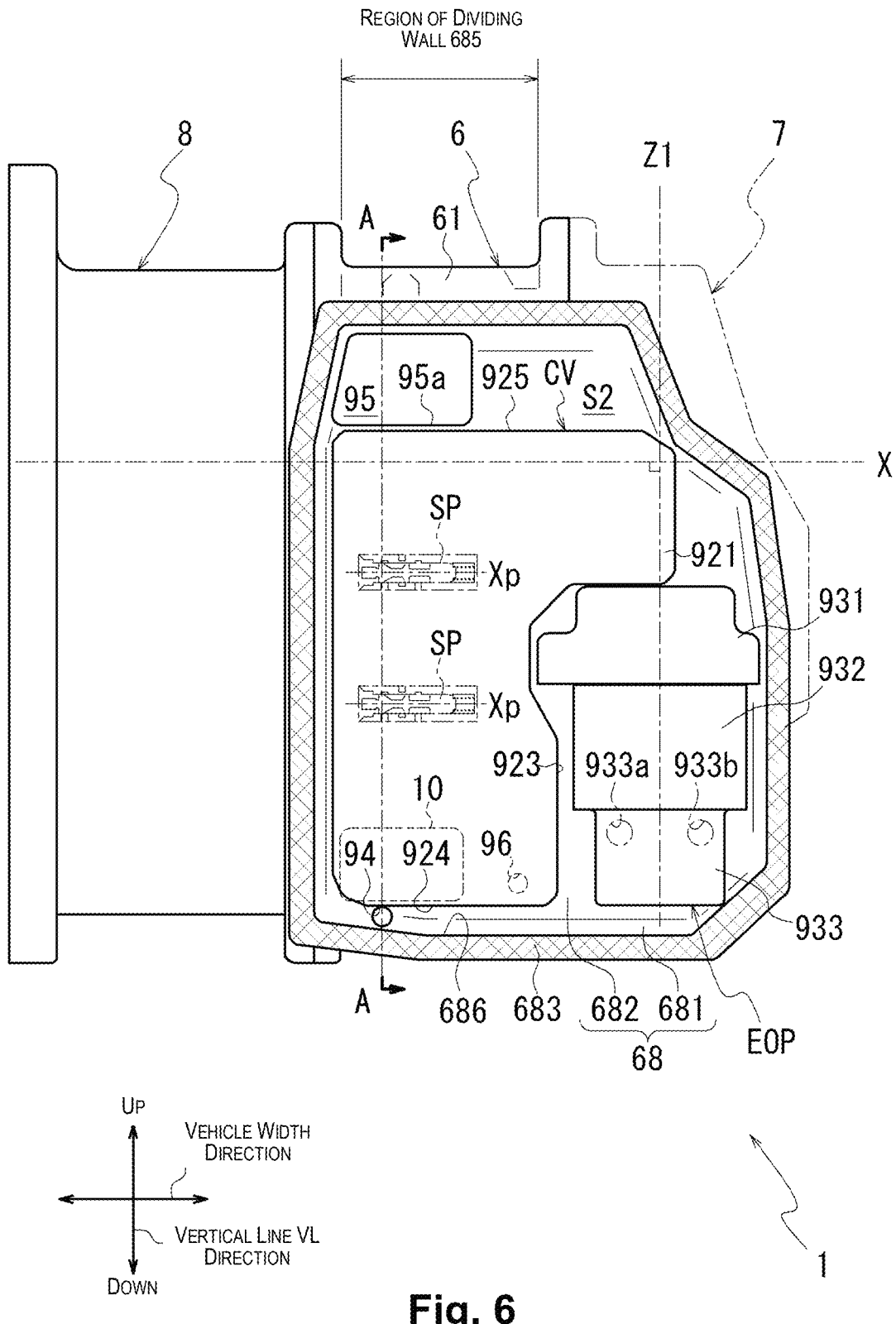
FIG. 6 is a schematic diagram of the case viewed from a vehicle front side.

FIG. 6 is a schematic diagram illustrating the state of the case 6 from the front of the vehicle. In FIG. 6, the location of the strainer 10, which is hidden behind the plane of the paper, is indicated by a dashed line for the sake of convenience of explanation.

As shown in FIG. 6, the housing section 68, as viewed from the front of the vehicle, has a surrounding wall 681 encompassing the entire outer circumference of the bottom wall section 682. The end surface of the surrounding wall 681 facing the viewer serves as a joining section 683 with the third cover 9. The joining section 683 is a flange section surrounding the entire circumference of the opening of the surrounding wall 681 on the third cover 9 side.

As shown in FIG. 2, a joining section 911 on the third cover 9 side is joined to the entire circumference of the joining section 683. The housing section 68 and the third cover 9 are connected by bolts, not shown, with the joining sections 683, 911 joined to each other. The opening of the housing section 68 is thereby maintained in a sealed state by the third covered 9, forming the closed second chamber S2.

The second chamber S2 accommodates the control valve CV and the electric oil pump EOP.

As shown in FIG. 2, the control valve CV has a basic structure in which a separation plate 920 is sandwiched between valve bodies 921, 921. An oil pressure control circuit 950 (see FIG. 7) is formed inside the control valve CV. The oil pressure control circuit 950 is provided with a solenoid that is driven based on instructions from a control device (not shown) and pressure regulating valves (spool valves) that operate based on signal pressure produced by the solenoid.

As shown in FIG. 6, inside the second chamber S2, the control valve CV is upright, so that the direction of stacking of the valve bodies 921, 921 is aligned in the front-rear direction of the vehicle (the direction toward and away from the viewer in the diagram).

In the second chamber S2, the control valve CV is upright so as to satisfy the following conditions. (a) A plurality of pressure regulating valves SP (spool valves) inside the control valve CV are arranged in the direction of the vertical line VL (the vertical direction) based on the state of installation of the power transmission device 1 in the vehicle V, and (b) a direction of advancement and retraction Xp of the pressure regulating valves SP (spool valves) is along the horizontal direction.

Advancement and retraction of the pressure regulating valves SP (spool valves) is thus not hindered, and the control valve CV is upright in the second chamber S2. This prevents the second chamber S2 from becoming larger in the forward and backward directions of the vehicle.

As shown in FIG. 6, the control valve CV, as viewed from the front of the vehicle, forms an approximate L-shape provided with a cut-out 923 in the essentially rectangular valve body 921. The cut-out 923 in the second chamber S2 is located under the region overlapping the first cover 7.

As viewed from the front of the vehicle, the cut-out 923 accommodates at least part of the electric oil pump EOP.

The electric oil pump EOP has a basic configuration in which a control unit 931, a motor unit 932, and a pump unit 933 are arranged in a straight line in the direction of axis of rotation Z1 of the motor.

The electric oil pump EOP is provided so that the axis of rotation Z1 is orthogonal to the axis of rotation X of the power transmission device 1. In this state, the pump unit 933 is located at the very bottom of the second chamber S2. An intake port 933*a* and a discharge port 933*b* of the pump unit 933 are located toward the border with the motor unit 932. The intake port 933*a* of the pump unit 933 is connected to the oil path 626 described above. The discharge port 933*b* of the pump unit 933 is connected to the control valve CV via another oil path in the case.

The intake port 933*a* is connected to the strainer 10 via the oil path 626 (see FIG. 3) inside the partition unit 62 described above.

The strainer 10 is housed in the first chamber S1 separately from the second chamber S2 of the control valve CV (see FIG. 3). As indicated by the dashed line in FIG. 6, the strainer 10, as viewed from the front of the vehicle, is arranged in the bottom of the second chamber S2, away from the viewer.

In the present embodiment, the positions of the intake port 933*a* of the pump unit 933 and the strainer 10 in the direction of the vertical line VL are brought closer by disposing the pump unit 933 of the electric oil pump EOP in the bottom of the second chamber S2.

The length of the oil path connecting the strainer 10 and the intake port 933*a* of the electric oil pump EOP can thus be minimized.

The top of the control valve CV extends to the top of the electric oil pump EOP. As viewed from the direction of the vertical line VL (the direction of the axis of rotation Z1 of the electric oil pump EOP), the electric oil pump EOP is set in a positional relationship overlapping the control valve CV.

The hydraulic pressure control circuit 950 inside the control valve CV regulates the pressure of the working oil in the power transmission mechanism (the torque converter T/C etc.) based on the oil pressure produced by the oil pump.

The power transmission device 1 is provided with one each of the mechanical oil pump MOP and the electric oil pump EOP as oil pumps. These oil pumps suction, pressurize, and then supply the oil OL collected in the bottom of the housing HS to the oil pressure control circuit 950 (see FIG. 7) in the control valve CV. At least one of the oil pumps is driven during operation of the vehicle V in which the power transmission device 1 is mounted. Note that in the following description, the notation oil pump OP will simply be used when no distinction is made between the mechanical oil pump MOP and the electric oil pump EOP.

Figure 7:
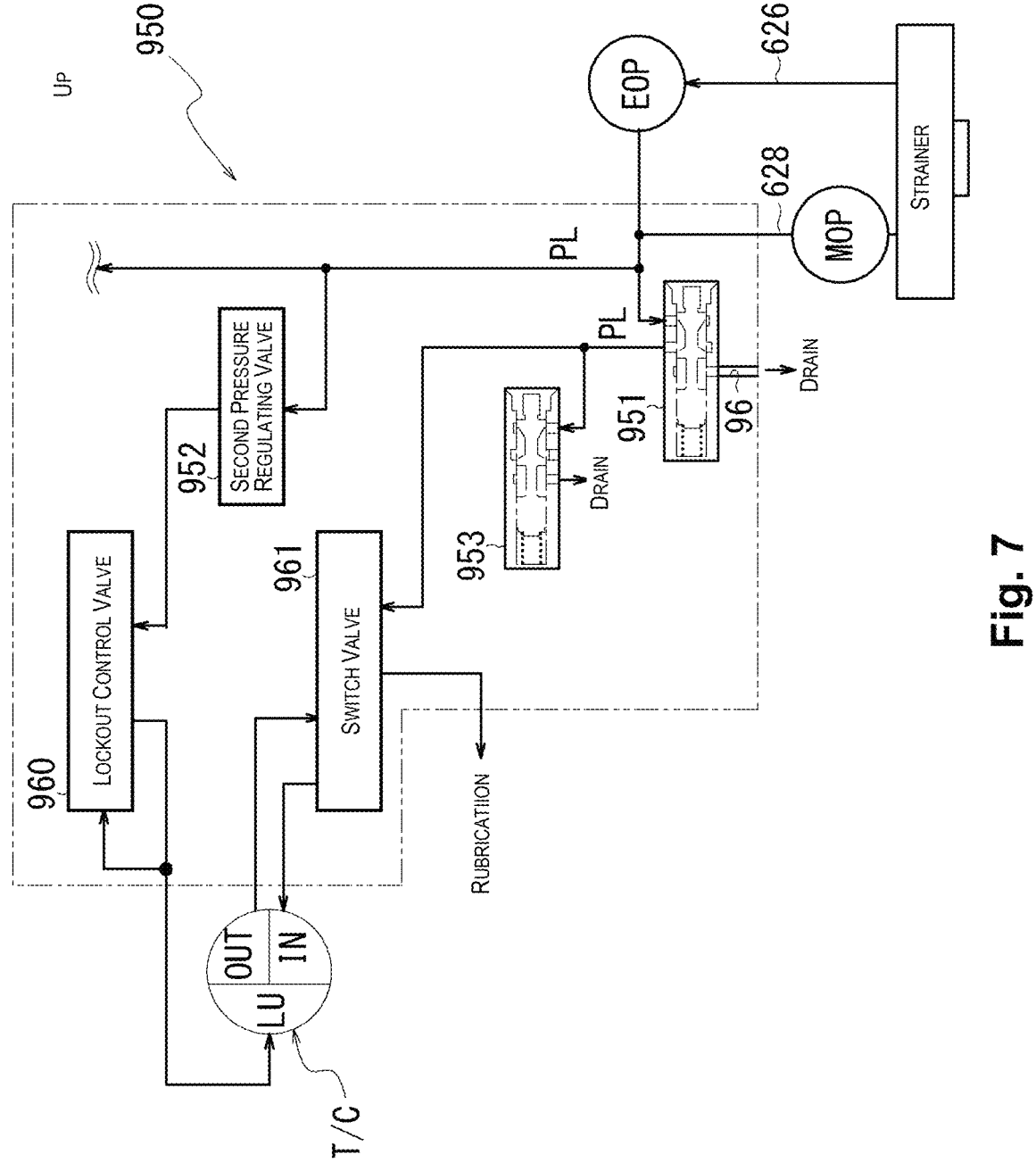
FIG. 7 is a diagram describing an example of an oil pressure control circuit inside a control valve.

FIG. 7 is a diagram describing an example of the oil pressure control circuit 950 inside the control valve CV, showing parts related to regulating the pressure of oil supplied to the torque converter T/C in the oil pressure control circuit 950.

A first pressure regulating valve 951 regulates the amount of drainage of the oil OL in the first pressure regulating valve 951 to regulate a line pressure PL from the oil pressure produced by the oil pump OP.

The line pressure PL regulated by the first pressure regulating valve 951 is regulated by a second pressure regulating valve 952 and then supplied to a lockup control valve 960.

The lockup control valve 960 regulates the lockup control pressure based on instructions from a control device, not shown, before the pressure is supplied to the torque converter T/C. In this way, the lockup clutch can be switched between engagement and release.

Further, the line pressure PL regulated by the first pressure regulating valve 951 is regulated by regulating the amount of drainage from a third pressure regulating valve 953 before the pressure is supplied to a switching valve 961.

The switching valve 961 switches between supplying the oil OL supplied from the third pressure regulating valve 953 to an inlet port in the torque converter T/C and supplying the oil OL returned from an outlet port to an oil cooler (not shown).

As mentioned above, the control valve CV is provided with a plurality of discharge ports 96 (see FIG. 7) for the drained oil OL.

Therefore, the oil OL discharged from the control valve CV collects inside the second chamber S2 housing the control valve CV.

As shown in FIG. 6, in the second chamber S2, a bottom edge 924 of the control valve CV is provided with a gap with a bottom edge 686 of the surrounding wall 681. In the second chamber S2, a communication hole 94 (through-hole) is provided in the lowermost section of the region of the bottom wall section 682 overlapping the circumferential wall section 61 on the case 6 side. This region is the region of the bottom wall section 682 that is the dividing wall 685.

The communication hole 94, as viewed from the front of the vehicle, opens between the bottom edge 924 of the control valve CV and the bottom edge 686 of the surrounding wall 681. The oil OL between the bottom edge 924 and the bottom edge 686 of the surrounding wall 681 can quickly move toward the communication hole 94 (away from the viewer).

Further, an opening 95 is provided in the uppermost section of the region of the dividing wall 685.

The communication hole 94 and the opening 95 communicate between the second chamber S2 and the first chamber S1.

A bottom edge 95a of the opening 95 is positioned at essentially the same height as a top edge 925 of the control valve CV. Note that the opening 95 may also be formed so that the bottom edge 95a of the opening 95 is positioned below the top edge 925 of the control valve CV. In this case, the opening 95, as viewed from the front of the vehicle, is formed with a region overlapping the control valve CV and extending below the top edge 925.

Thus, the second chamber S2 communicates with the first chamber S1 above and below in the direction of the vertical line VL based on the state of installation of the power transmission device 1 in the vehicle V.

Figure 8:
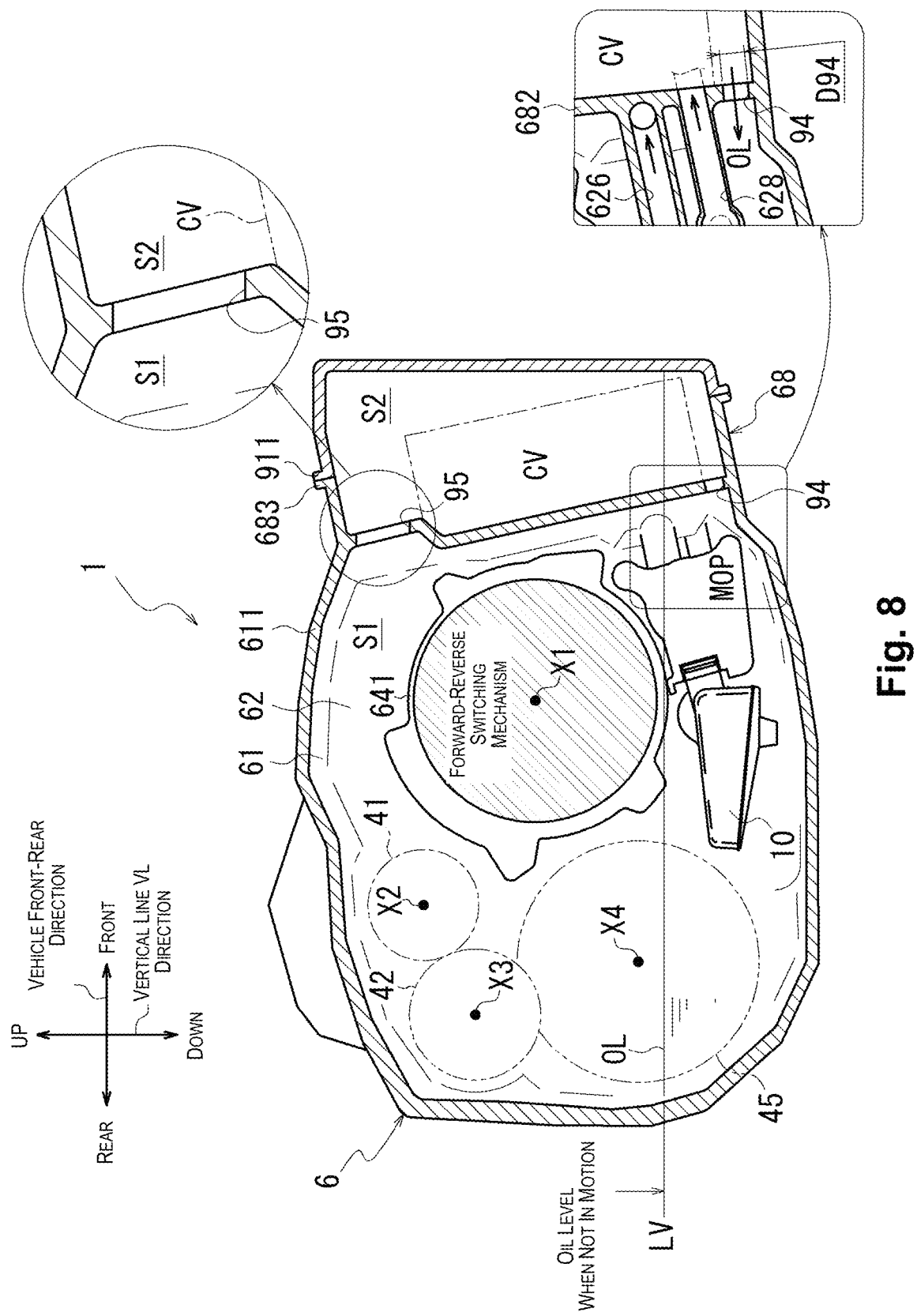
FIG. 8 is a schematic diagram of the cross section of the case section at the position of a communication hole viewed from the second cover side.
Figure 9:
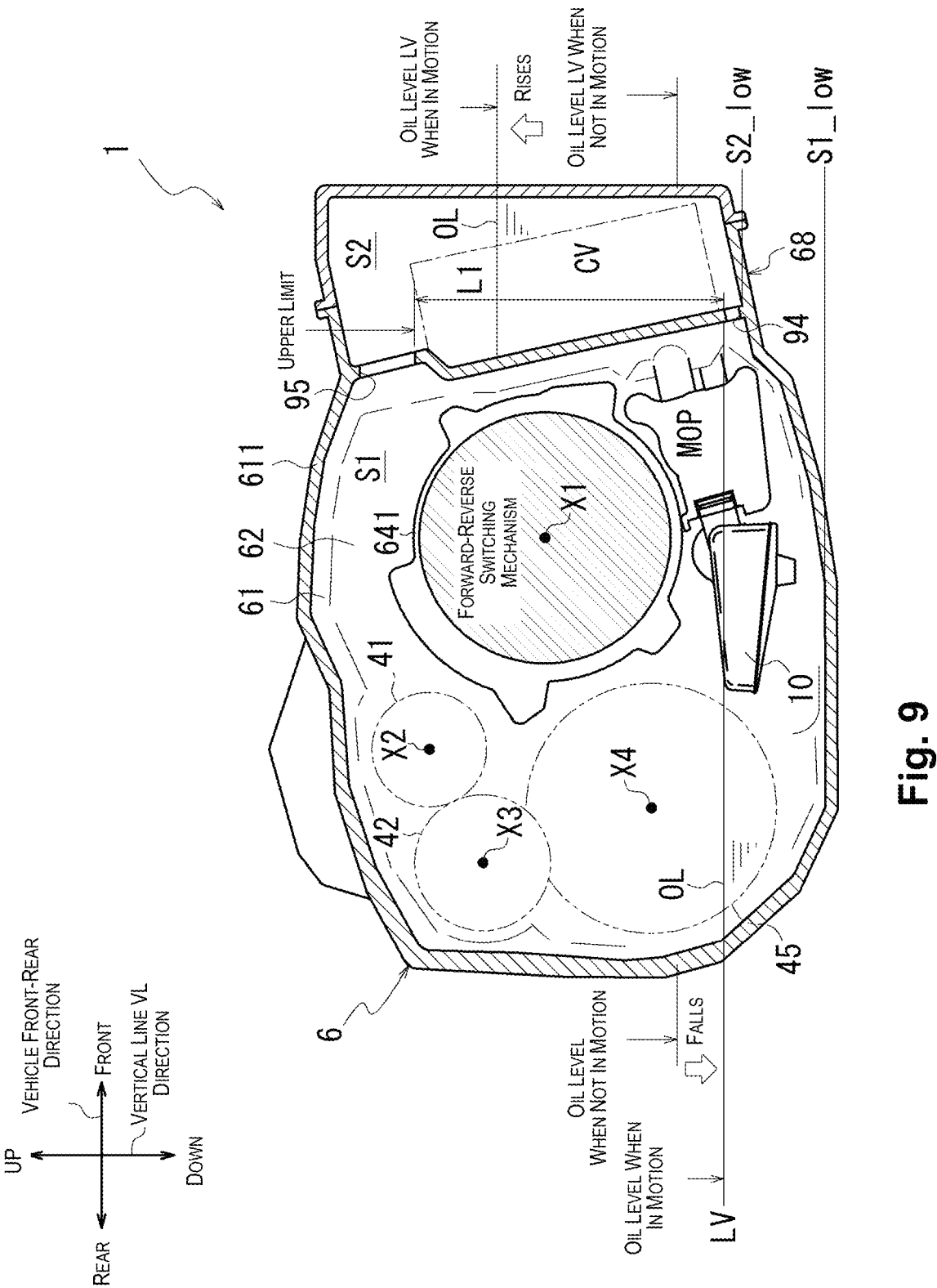
FIG. 9 is a schematic diagram of the cross section of the case section at the position of a communication hole viewed from the second cover side.

FIGS. 8 and 9 are diagrams schematically showing cross sections of the case 6 along line A-A in FIG. 6 for describing the height of the oil OL (the oil level) collected in the first chamber S1 and the second chamber S2.

Note that in FIGS. 8 and 9, the rotating bodies located in the first chamber S1 inside the case 6 are indicated in simplified form (the output gear 41, the idler gear 42, and the final gear 45). The control valve CV located in the second chamber S2 in the housing section 68 is also shown in a simplified manner.

Further, in the enlarged view located at the bottom of FIG. 8, a schematic cross section is shown to describe the positional relationship between the oil paths 626, 628 located in the partition 62 and the communication hole 94 provided in the region of the dividing wall 685.

As shown in FIG. 8, the communication hole 94 is positioned below the oil paths 626, 628 described above. The communication hole 94 is positioned below an oil level LV when the vehicle V in which the power transmission device 1 is mounted is not in motion. Therefore, the communication hole 94 is submerged in oil at least when the vehicle V is not in motion.

The opening 95 opens above the control valve CV in the second chamber S2. The opening 95 is located in air both when the vehicle V is in motion and when the vehicle is not in motion and allows movement of air (gas) between the first chamber S1 and the second chamber S2.

Therefore, the height of the oil OL (oil level) in the first chamber S1 and the height of the oil level OL (oil level) in the second chamber eventually match while the vehicle Vin which the power transmission device 1 is mounted is not in motion.

The vehicle V in which the power transmission device 1 not in motion (not traveling) here means the same as power transmission not being carried out to the drive wheels WH, WH via the power transmission device 1.

Further, it also means that the oil pumps (electric oil pump EOP, mechanical oil pump MOP) are not being driven.

When the vehicle V in which the power transmission device 1 is mounted begins moving, the rotating bodies inside the first chamber S1 (the output gear 41, the idler gear 42, the final gear 45, and the differential case 50) turn, transmitting the rotational drive power of the engine ENG to the drive wheels WH, WH. When this occurs, at least one of the electric oil pump EOP or the mechanical oil pump MOP is driven in order to operate and lubricate the power transmission mechanism.

When the vehicle V starts, the final gear 45 and the differential case 50 turn around the axis of rotation X4, scooping up the oil OL collected in the bottom of the first chamber S1. A portion of the oil OL that has been scooped up moves toward the front of the vehicle along the top of the case 6 and flows into the second chamber S2 from the opening 95.

Further, the oil OL collected in the bottom of the first chamber S1 is suctioned by the strainer 10 due to the driving of the oil pumps (at least one of the electric oil pump EOP or the mechanical oil pump MOP). The oil OL suctioned by the oil pump is pressurized and supplied to the control valve CV.

In the present embodiment, an opening area D94 (opening diameter) of the communication hole 94 is set so as to satisfy the following conditions.

(a) The amount of oil flowing from the second chamber S2 to the first chamber S1 through the communication hole 94 is less than the amount of oil drained into the second chamber S2 from the control valve CV.

As shown in FIG. 9, this setting reduces the height of the oil in the first chamber S1 and raises the height of the oil OL in the second chamber S2 while the vehicle Vis in motion.

In this state, in the first chamber S1, friction of the oil OL with respect to rotation of the final gear 45 is reduced. This reduces the load on the engine ENG and can be expected to improve engine efficiency.

Further, in the second chamber S2, the control valve CV and the electric oil pump EOP are submerged in oil. The control valve CV and the electric oil pump EOP are thus cooled by the oil OL collected in the second chamber S2. The thermal efficiency of at least the electric oil pump EOP is thus improved.

The opening 95 communicating between the second chamber S2 and the first chamber S1 is provided at the top of the second chamber S2. Therefore, when the height of the oil OL collected in the second chamber S2 reaches the height of the opening 95, any of the oil OL beyond the height of the opening 95 is returned to the first chamber S1.

This prevents the height of the oil in the first chamber S1 from becoming too low, which would result in a lack of the oil OL necessary to lubricate and cool the rotating bodies in the first chamber S1 (the output gear 41, the idler gear 42, the final gear 45, and the differential case 50, etc.).

In the present embodiment, a separation distance L1 between the communication hole 94 and the opening 95 in the direction of the vertical line VL is set based on the results of experiments, simulations, etc., to prevent the oil OL necessary to lubricate and cool the rotating bodies in the first chamber S1 from being insufficient. Note that the parameters taken into consideration when the separation distance L1 is set include at least the following: (a) the volume of the second chamber S2, (b) the amount of oil necessary to lubricate and cool the rotating bodies in the first chamber S1, and (c) the height of the oil OL necessary to lubricate and cool the rotating bodies in the first chamber S1.

Thus, while the vehicle V is in motion, a lack of the oil OL necessary to lubricate and cool the rotating bodies in the first chamber S1 is prevented and the height of the oil OL in the first chamber S1 is lowered. The friction to which the rotating bodies in the first chamber S1 are subjected by the oil OL in the first chamber S1 is thus lowered. Since the load on the engine ENG can be reduced, the fuel efficiency of the vehicle V in which the power transmission device 1 is mounted can be expected to be improved.

Figure 10:
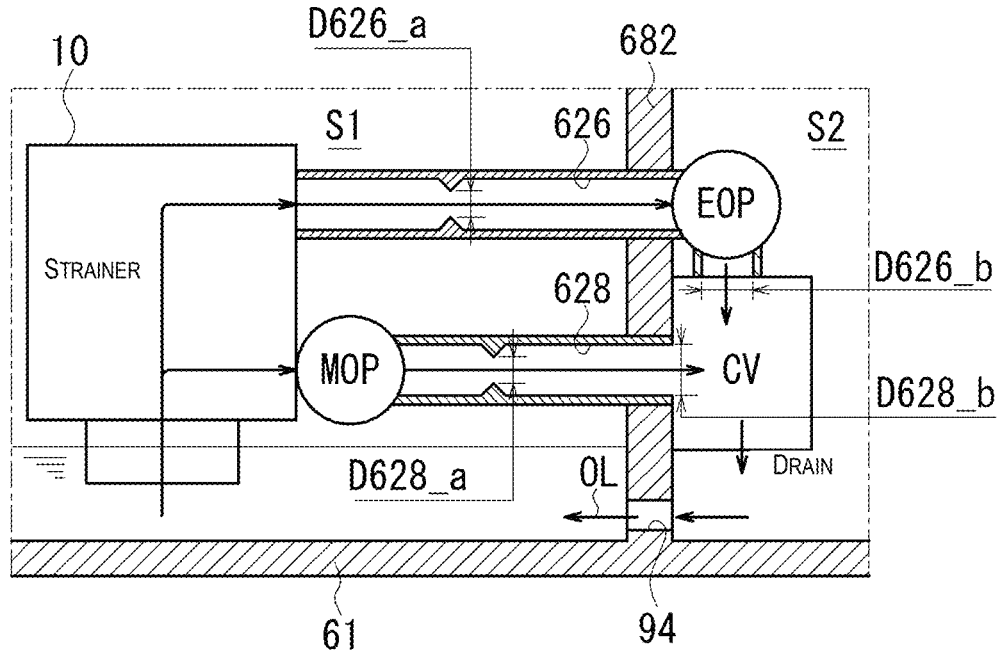
FIG. 10 is a diagram illustrating an oil path from the strainer to the control valve.

FIG. 10 is a diagram schematically showing an oil path from the strainer 10 to the control valve CV. As mentioned above, in the present embodiment, the amount of oil flowing into the first chamber S1 from the second chamber S2 through the communication hole 94 is less than the amount of oil drained into the second chamber S2 from the control valve CV. This is to collect the oil OL in the second chamber S2 and make the height of the oil OL in the first chamber S1 a height capable of reducing the friction on the rotating bodies in the first chamber S1 while the vehicle V is in motion.

As shown in FIG. 10, the path for supplying the oil OL from the strainer 10 to the control valve CV is made up of two paths: a first path along the mechanical oil pump MOP, and a second path along the electric oil pump EOP.

When the discharge force of the electric oil pump EOP and the mechanical oil pump MOP are the same, a difference arises between the amount of the oil OL supplied from the electric oil pump EOP to the control valve CV and the amount of the oil OL supplied from the mechanical oil pump MOP to the control valve CV, corresponding to the flow path resistance in the first path and the flow path resistance in the second path.

The greater the flow path resistance, the smaller the amount of oil supplied to the control valve CV. When the amount of oil supplied to the control valve CV decreases, the amount of oil drained into the second chamber S2 from the control valve CV decreases.

In other words, a proportional relationship is established between the amount of oil supplied to the control valve CV and the amount of oil drained from the control valve CV.

Accordingly, the amount of oil flowing through the communication hole 94 from the second chamber S2 to the first chamber S1 can be made smaller than the amount of oil drained from the control valve CV into the second chamber S2 by setting the opening area toward the communication hole 94 based on the path (the first path or the second path) having the greater flow path resistance.

For example, if the flow path resistance of the first path is greater than the flow path resistance of the second path, the amount of oil supplied to the control valve CV can be calculated using the flow path resistance of the first path and the output from the mechanical oil pump MOP.

The height of the oil OL in the first chamber S1 can be minimized while collecting the oil OL in the second chamber S2 while the vehicle V is in motion by setting the opening area of the communication hole 94 so as to satisfy the condition that the amount of oil flowing through the communication hole 94 from the second chamber S2 to the first chamber S1 is less than the calculated amount of oil.

That is, (i) the opening area of the communication hole 94 is calculated using the flow path resistance of the first path passing through the mechanical oil pump MOP or the second path passing through the electric oil pump EOP, whichever has the greater flow path resistance, and the output of the oil pump OP passing the oil OL to the flow path having the greater flow path resistance.

Thus, it is possible to make the amount of oil flowing through the communication hole 94 from the second chamber S2 to the first chamber S1 smaller than the amount of oil drained from the control valve CV into the second chamber S2.

Note that (ii) an oil amount (V1) supplied to the control valve CV is calculated using the flow path resistance of the first path and the output of the mechanical oil pump MOP, and an oil amount (V2) supplied to the control valve CV is calculated using the flow path resistance of the second path and the output of the electric oil pump EOP. It is also possible to set the opening area of the communication hole 94 based on the average value of the calculated oil amount (V1) and the calculated oil amount (V2).

The amount of oil supplied to the control valve CV depends on the flow path resistance of the path through which the oil OL passes, but also depends on the area of the place along the path where the flow path cross-sectional area is smallest. There is also a proportional relationship between the minimum flow path cross-sectional area and the amount of oil supplied to the control valve CV.

Therefore, (iii) it is also possible to set the opening area of the communication hole 94 based on the first path passing through the mechanical oil pump MOP or the second path passing through the electric oil pump EOP, whichever has the smaller minimum flow path cross-sectional area along the path. For example, in the case of FIG. 10, there is a place in the oil path 626 where the flow path cross-sectional area is smallest, and we shall designate the flow path cross-sectional area of this section as D626_*a*. There is a place in the oil path 628 where the flow path cross-sectional area is smallest, and we shall designate the flow path cross-sectional area of this section as D628_*a*.

The amount of oil supplied to the control valve CV is calculated using the flow path cross-sectional areas (D626_*a*, D628_*a*) of the places in the paths where the flow path cross-sectional area is smallest, looking generally at the correlation between flow path cross-sectional area and the amount of oil supplied to the control valve CV.

It is also possible to set the opening area of the communication hole 94 so as to satisfy the condition that the amount of oil flowing through the communication hole 94 from the second chamber S2 to the first chamber S1 is less than the calculated amount of oil.

Thus, the amount of oil supplied to the control valve CV is calculated using the flow path resistance of the path connecting the strainer 10 and the control valve CV and the flow path cross-sectional area of the place in the path having the smallest flow path cross-sectional area. The opening area of the communication hole 94 may also be calculated to satisfy the condition that the amount of oil passing through the communication hole 94 from the second chamber S2 to the first chamber S1 is less than the calculated amount of oil.

Moreover, (iii) The amount of oil (V1) supplied to the control valve CV is calculated using the flow path cross-sectional area D628_*b* of the connection port between the first path and the control valve CV and the output of the mechanical oil pump MOP, and an oil amount (V2) supplied to the control valve CV is calculated using the flow path resistance of the flow path cross-sectional area D626_b in the connection port between the second path and the control valve CV and the output of the mechanical oil pump EOP.

The opening area of the communication hole 94 is set based on the smaller oil amount.

Thus, it is possible to make the amount of oil flowing through the communication hole 94 from the second chamber S2 to the first chamber S1 smaller than the amount of oil drained from the control valve CV into the second chamber S2.

Note that the flow path resistance when the oil OL passes through the communication hole 94 may be used as a parameter instead of the opening area of the communication hole 94.

In this case, the amount of oil that can pass per unit time can be calculated from the flow path resistance of the communication hole 94; thus, a general picture of the correlation between flow path resistance and the amount of oil that can pass can be obtained by experiment and simulation. It is also possible to calculate the amount of oil supplied to the control valve CV using this methodology to determine the flow path resistance satisfying the condition that the amount of oil passing through the communication hole 94 is less than the calculated amount of oil.

In this case, the diameter of the communication hole 94 and the length of the communication hole 94 can be appropriately set using the determined flow path resistance. Further, if instead of the communication hole 94 an oil path is provided connecting the first chamber S1 and the second chamber S2, the length, opening area, minimum opening area, etc., of the oil path can be set so that the flow path resistance of this oil path equals the determined flow path resistance.

By taking all of the above-mentioned factors into consideration, it is possible to make the amount of oil returned from the second chamber S2 to the first chamber S1 less than the amount of oil drained from the control valve CV into the second chamber S2.

With the power transmission device 1 described above, a case was described in which one communication hole 94 was provided to the dividing wall 685. The communication hole 94 is not limited to only one. It is also possible to provide a plurality of communication holes 94 to the dividing wall 685. In this case, the opening area of communication hole 94 determined based on the amount of oil drained and the control valve CV to the second chamber S2 is equivalent to the total sum of the temperature areas of the communication holes 94.

For example, if the opening area of the communication hole 94 determined using the amount of oil drained from the control valve CV to the second chamber S2 is 2 cm$^2$ and the total number of communication holes 94 is two, then the opening area of the communication holes 94 may be set so that the sum of the opening area of one of the communication holes 94 and the opening area of the other communication hole 94 is 2 cm$^2$.

As described above, the power transmission device 1 according to the present embodiment has the following configuration.

(1) The power transmission device 1 comprises the power transmission mechanism (the torque converter T/C the forward-reverse switching mechanism 2, the variator 3, the reduction mechanism 4, and the differential device 5) that transmits drive power from the engine ENG (drive source)

to the drive wheels WH, WH, the housing HS that houses the power transmission mechanism, the control valve CV that controls the oil pressure supplied to the power transmission mechanism (the torque converter T/C, the forward-reverse switching mechanism 2, the variator 3, the reduction mechanism 4, and the differential device 5), the oil pump OP that supplies the oil OL to the control valve CV, the dividing wall 685 (partition section) that divides the inside of the housing HS into the first chamber S1, which houses the power transmission mechanism (the torque converter T/C, the forward-reverse switching mechanism 2, the variator 3, the reduction mechanism 4, and the differential device 5), and the second chamber S2, in which the control valve CV is arranged upright, and the communication hole 94 that functions as a communication path connecting the first chamber S1 and the second chamber S2.

The opening area D94 of the communication hole 94 is set so that the amount of oil passing through the communication hole 94 from the second chamber S2 into the first chamber S1 is less than the amount of oil drained from the control valve CV into the second chamber S2 during operation of the vehicle V in which the power transmission device 1 is mounted.

With this configuration, during operation of the vehicle V in which the power transmission device 1 is mounted, the oil OL drained from the control valve CV is collected in the second chamber S2 inside the housing HS and the oil level in the second chamber S2 rises, but the oil level in the first chamber S1 inside the housing HS falls. That is, the oil level LV (height of the oil surface) inside the housing HS (inside the first chamber S1) can be made lower than when the vehicle V is not in motion.

Further, the agitation resistance of the oil OL in the rotating bodies making up the power transmission mechanism can be reduced by reducing the oil level LV inside the first chamber S1. Therefore, the load on the engine ENG is reduced, making it possible to prevent a drop in the efficiency of the engine ENG. An increase in the fuel efficiency of the vehicle V in which the power transmission device 1 is mounted can be expected.

(2) The power transmission device 1 comprises the power transmission mechanism (the torque converter T/C the forward-reverse switching mechanism 2, the variator 3, the reduction mechanism 4, and the differential device 5) that transmits drive power from the engine ENG (drive source) to the drive wheels WH, WH, the housing HS that houses the power transmission mechanism, the control valve CV that controls the oil pressure supplied to the power transmission mechanism (the torque converter T/C, the forward-reverse switching mechanism 2, the variator 3, the reduction mechanism 4, and the differential device 5), the oil pump OP that supplies the oil OL to the control valve CV, the dividing wall 685 (partition section) that divides the inside of the housing HS into the first chamber S1, which houses the power transmission mechanism (the torque converter T/C, the forward-reverse switching mechanism 2, the variator 3, the reduction mechanism 4, and the differential device 5), and the second chamber S2, in which the control valve CV is arranged upright, oil paths 626, 628 that function as flow paths for the oil OL supplied from the first chamber S1 to the control valve CV, and the communication hole 94 that functions as a communication path connecting the first chamber S1 and the second chamber S2.

The flow path cross-sectional area of the oil paths 626, 628 is greater than the opening area of the communication hole 94.

With this configuration, the opening area of the communication hole 94 functioning as the communication path is smaller than the opening area (flow path cross-sectional area) of the oil paths 626, 628 functioning as the flow paths for the oil OL, so that the amount of oil drained into the second chamber S2 is greater than the amount of oil returned from the second chamber S2 to the first chamber S1. As a result, the oil OL collects more easily in the second chamber S2.

The oil level LV inside the first chamber S1 while the vehicle V is in motion can thereby be made less than when the vehicle V is not in motion. Thus, it is possible to reduce the resistance (agitation resistance) to rotation by the rotating bodies located inside the first chamber S1. The transmission efficiency of the rotating drive force transmitted by the power transmission device 1 is thereby improved. Further, because the load on the engine ENG is reduced, improvements in the fuel efficiency of the vehicle V in which the power transmission device 1 is mounted can be expected.

(3) The housing HS comprises the case 6 having the circumferential wall section 61 surrounding the first chamber S1, and the housing section 68 having the surrounding wall 681 surrounding the second chamber S2.

The surrounding wall 681 of the housing section 68 is attached to the side surface of the circumferential wall section 61 of the case 6 toward the front of the vehicle.

The region of the circumferential wall section 61 of the case 6 located toward the boundary with the first chamber S1 and the second chamber S2 is the dividing wall 685 (partition section).

With this configuration, the length of the second chamber S2 in the direction of the vertical line can be made greater than the length in the front-rear direction of the vehicle by arranging the control valve CV upright inside the housing section 68. The height of the oil OL collected in the second chamber S2 can thereby be made greater than the height of the oil OL inside the first chamber S1 when the power transmission device 1 is being driven. Thus, it is possible to reduce the resistance (friction) on the rotating bodies (e.g., the final gear 45) rotating inside the first chamber S1.

One conceivable means of reducing the friction on the rotating body is to make the volume of the first chamber S1 wider in the horizontal line direction, but in this case, the housing HS would become larger in the horizontal line direction (the front-rear direction of the vehicle and the vehicle width direction).

By arranging the control valve CV upright inside the second chamber S2 that is provided on the side surface of the case 6 toward the front of the vehicle, the volume of the second chamber S2 in the vertical line VL direction can be maintained without increasing the size of the second chamber S2 in the horizontal line direction. Therefore, providing the second chamber S2 predicated on the control valve CV being upright can favorably prevent the housing HS from becoming larger in the horizontal line direction.

Further, when the power transmission device 1 is stopped, the oil OL inside the second chamber S2 flows quickly into the first chamber S1 due to its own weight, resulting in equal heights of the oil OL in the first chamber S1 and the second chamber S2.

If the height of the oil OL inside the first chamber S1 remains low even after the power transmission device 1 has been stopped, the cooling efficiency of the rotating bodies in the first chamber S1 is adversely affected.

By returning the oil OL inside the second chamber S2 to the first chamber S1 after the power transmission device 1 has been stopped, the height of the oil OL inside the first chamber S1 can be raised to match the height of the oil OL inside the second chamber S2.

An improvement in the cooling efficiency of the rotating bodies inside the first chamber S1 after the power transmission device 1 has been stopped can thereby be expected.

(4) The communication hole 94 functioning as the communication path is a through-hole provided in the dividing wall 685 dividing the first chamber S1 from the second chamber S2.

With this configuration, simply providing a through-hole in the dividing wall 685 makes it possible to connect the first chamber S1 and the second chamber S2 by the shortest distance. The amount of oil returned from the second chamber S2 to the first chamber S1 can easily be regulated by simply changing the opening diameter (opening area) of the communication hole 94, which is a through-hole.

(i) The communication hole 94 connects the first chamber S1 and the bottom of the second chamber S2.

With this configuration, if a bottom edge S2_low (see FIG. 9) of the second chamber S2 is at the same height as a bottom edge S1_low (see FIG. 9) of the first chamber S1, or if the bottom edge S2_low of the second chamber S2 is in a higher position than the bottom edge S1_low of the first chamber S1, the oil OL collected in the second chamber S2 can be returned to the first chamber S1 when the vehicle V is not in motion.

The height of the oil surface inside the first chamber S1 when the vehicle V is not in motion can thereby be made higher than when in motion. Therefore, when the oil pumps are driven to initiate travel with the temperature of the oil OL low in a low-temperature environment, the possibility of the oil pump drawing in air due to poor fluidity of the oil OL can be minimized. The occurrence of problems caused by drawing in air in the power transmission device 1 can be minimized, such as a drop in the oil pressure supplied to the control valve CV.

(5) The communication hole 94 is provided in a position lower than the height of the oil OL in the first chamber S1 when the vehicle V is not in motion in the direction of the vertical line VL based on the state of installation of the power transmission device 1 in the vehicle V.

With this configuration, the communication hole 94 is provided in a position submerged in the oil OL collected inside the housing HS when the vehicle V is not in motion.

Since the first chamber S1 communicates with the second chamber S2 by the opening 95 provided at the top of the housing HS, the height of the oil OL (oil level) inside the first chamber S1 is at the same height as the oil OL (oil level) inside the second chamber S2 when the vehicle V is not in motion.

In particular, the position of the communication hole 94 in the direction of the vertical line VL is set to be no greater than the maximum height of the oil OL in the first chamber S1 when the vehicle V is not in motion.

Therefore, the height of the oil OL inside the first chamber S1, which becomes lower while the vehicle V is in motion, can be returned to this maximum height while the vehicle V is not in motion, i.e., while the vehicle V is stopped or parked.

When the vehicle V in which the power transmission device 1 is mounted moves thereafter, the possibility of the oil pump (the electric oil pump EOP, the mechanical oil pump MOP) drawing in air can thereby be reduced. Collection of the oil OL in the second chamber S2 thereby makes it possible to reduce the possibility of an adverse effect when the vehicle V starts moving thereafter.

(6) The opening 95 (communication section) that causes the first chamber S1 and the second chamber S2 to communicate is provided in the top of the dividing wall 685.

With this configuration, when the oil OL collected inside the second chamber S2 reaches the height of the opening 95, the oil OL in the second chamber S2 is returned to the first chamber S1 through the opening 95. The possibility of there not being enough of the oil OL in the first chamber S1 while the vehicle V is in motion can thereby be reduced. An insufficient amount of oil in the first chamber S1 can cause an insufficient amount of lubrication and cooling of the rotating bodies inside the first chamber S1 (the output gear 41, the idler gear 42, the final gear 45, the differential case 50, etc.). Providing the opening 95 reduces the possibility of there not being enough of the oil OL to lubricate the rotating bodies inside the first chamber S1.

(ii) The control valve CV is provided in a direction along the direction of the vertical line VL based on the state of installation of the power transmission device 1 in the vehicle V.

The control valve CV has a basic structure in which the separation plate 920 is sandwiched between the valve bodies 921, 921.

The control valve CV is provided so that the stacking direction of the valve bodies 921, 921 is a direction aligned with the vehicle front-rear direction.

The thickness of the control valve CV in the stacking direction is less than the thickness in the direction orthogonal to the stacking direction. By arranging the control valve CV along the vertical line VL direction so that the stacking direction of the control valve CV is aligned in the horizontal line HL direction (vehicle front-rear direction), the thickness (volume) required for the installation of the control valve CV in the horizontal line HL direction is reduced.

The second chamber S2 housing the control valve CV thereby becomes shorter in the horizontal line HL direction and longer in the vertical line VL direction, forming a vertically elongated shape.

Since the internal volume of the second chamber S2 is smaller than the first chamber S1, the height of the oil OL stored in the second chamber S2 can be increased when the vehicle V is in motion. The amount of oil submerging the control valve CV can thereby be increased.

If the control valve CV is arranged to be in air, there is a possibility of air entering the oil pressure supplied to the power transmission mechanism from the control valve CV due to leakage of the oil OL from the control valve CV or penetration of the oil OL into the control valve CV.

In this case, there is a potential for problems caused by drawing in air to arise, such as delays in the operational timing of the power transmission mechanism (the torque converter T/C, the forward-reverse switching mechanism 2, and the variator 3).

With this configuration, the possibility of air being included in the oil pressure supplied to the power transmission mechanism from the control valve CV can be reduced by arranging the control valve CV to be in oil. This reduces the possibility of problems caused by drawing in air arising in the power transmission mechanism and can improve control characteristics of the power transmission device.

Note that while the vehicle V is in motion, if the height of the oil OL collected in the second chamber S2 is sufficiently greater than the height of the oil OL in the first chamber S1, the oil OL collected in the second chamber S2 quickly flows into the first chamber S1 due to its own weight when the vehicle V stops moving. Therefore, because the height of the oil OL inside the first chamber S1 can be returned to a prescribed height preparing for later motion of the vehicle V, the possibility of drawing in air when the vehicle V starts moving can be reduced.

(7) The electric oil pump EOP has the motor section 932 (motor) that drives the pump section 933 (pump mechanism).

With this configuration, at least the motor section 932 in the electric oil pump EOP can be submerged in the oil OL collected in the second chamber S2. The motor section 932 can thereby be cooled by the oil OL collected in the second chamber S2, making it possible to improve heat management characteristics of the electric oil pump EOP.

(8) The electric oil pump EOP comprises the pump unit 933 (pump mechanism), the motor unit 932 (motor) which drives the pump unit 933, and a control unit 931 (inverter) which controls the motor unit 932.

With this configuration, the oil OL is collected in the second chamber S2 when the power transmission device 1 is being driven. The inverter of the electric oil pump EOP is therefore submerged in the oil OL collected in the second chamber S2. The inverter can thereby be cooled by the oil OL collected in the second chamber S2, making it possible to improve the heat management properties of the electric oil pump EOP.

(iii) The pump unit 933, the motor unit 932, and the control unit 931 are arranged in the direction of the axis of rotation Z1 of the motor.

The electrical oil pump EOP is provided so that the axis of rotation Z1 of the motor is orthogonal to the axis of rotation X of the power transmission mechanism.

The electric oil pump EOP is arranged upright in the second chamber S2, so that the motor unit 932 is positioned below the control unit 931.

With this configuration, the pump unit 933 can be arranged at the bottom of the second chamber S2 in the direction of the vertical line VL. In this case, as viewed from the front of the vehicle, the intake port 933a of the oil in the pump unit 933 can be brought closer to the strainer 10, which is disposed in the bottom of the housing HS.

The length of the oil path in the case connecting the strainer 10 and the intake port of the oil OL can thereby be made even shorter, making it possible to expect a greater reduction in suction resistance.

Further, since there are more opportunities to submerge the motor unit 932 in the oil OL collected in the second chamber S2, those parts of the electric oil pump EOP which tend to get hottest can be appropriately cooled.

Figure 11:
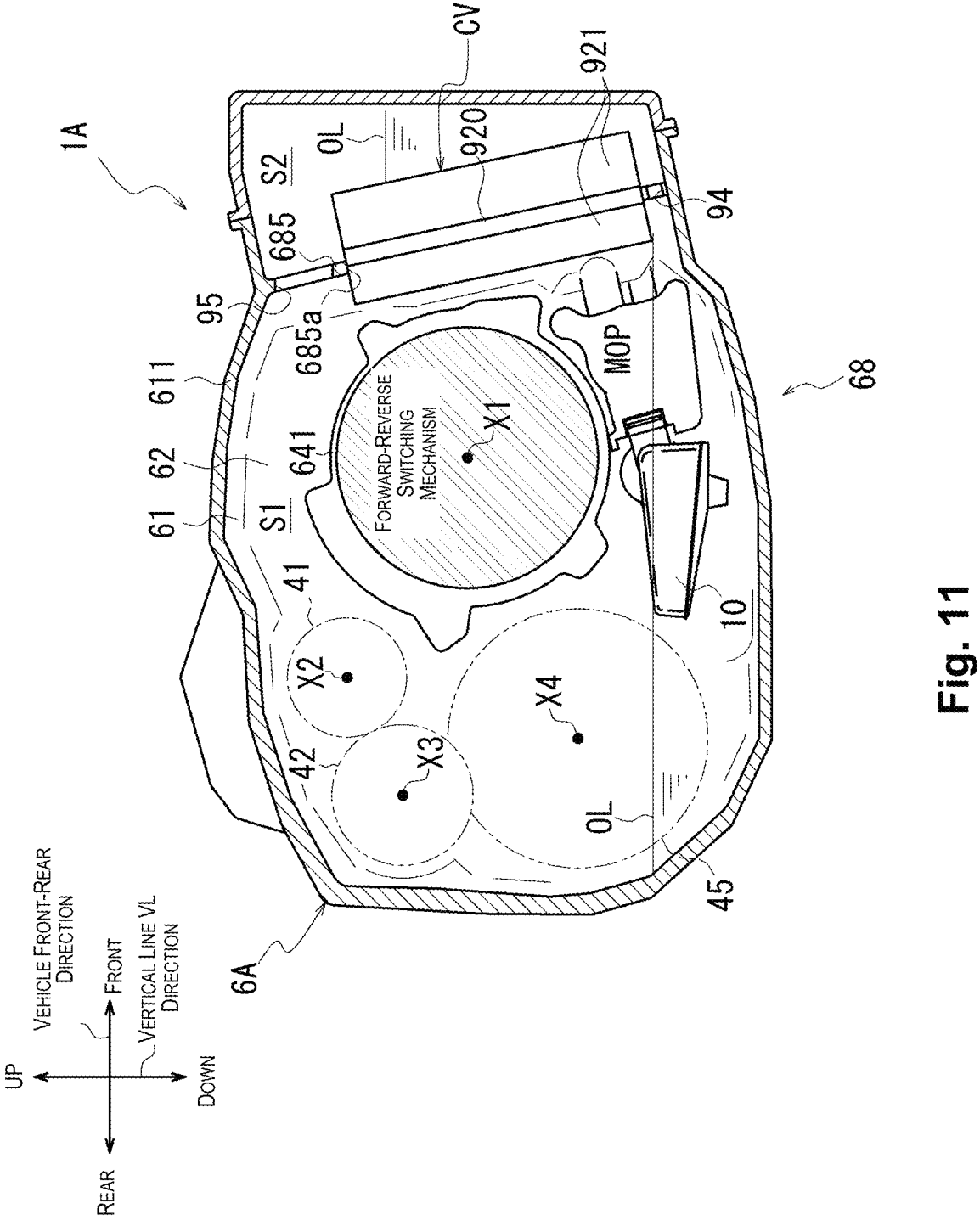
FIG. 11 is a schematic diagram illustrating a general configuration of the power transmission device according to a variant.

FIG. 11 is a schematic diagram showing a general configuration of a power transmission device 1A according to a variant.

In the foregoing embodiment, a case was illustrated in which the first chamber S1 accommodating the strainer 10 and the second chamber S2 accommodating the electric oil pump EOP and the control valve CV were completely separated by the dividing wall 685.

As shown in FIG. 11, it is also possible to use the power transmission device 1A using a case 6A in which the first chamber S1 and the second chamber S2 communicate via an opening 685a provided in the dividing wall 685.

In the power transmission device 1A, the control valve CV is disposed so as to block the opening 685a and divide the first chamber S1 and the second chamber S2. The discharge port for the oil OL in the control valve CV is set to open inside the second chamber S2.

With the power transmission device 1A having this configuration, as well, the oil OL can be collected in the second chamber S2 and the height of the oil OL in the first chamber S1 can be made lower while the vehicle Vis in motion.

Figure 12:
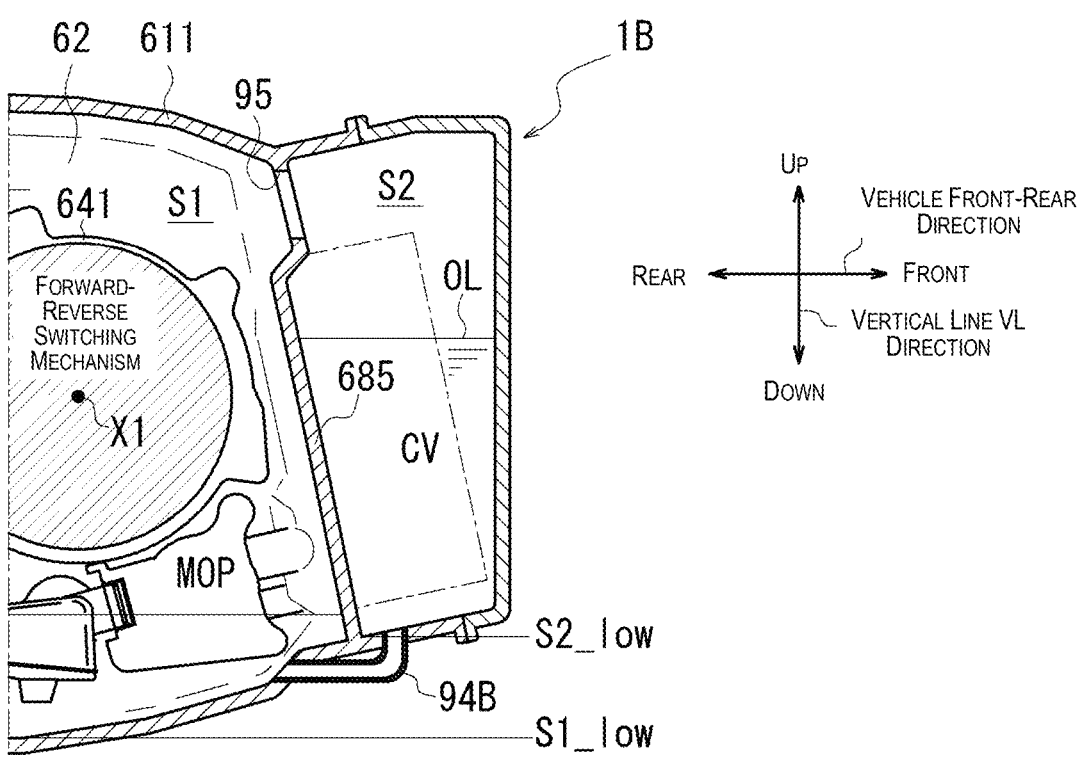
FIG. 12 is a schematic diagram illustrating a general configuration of the power transmission device according to a variant.
Figure 13:
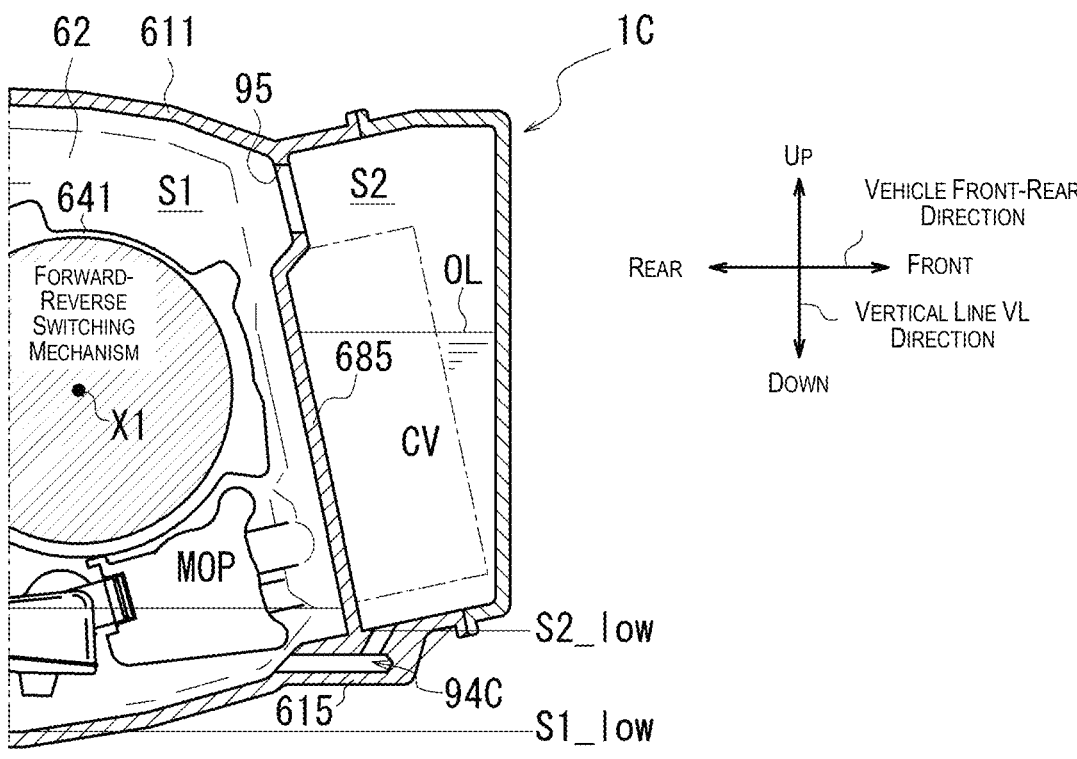
FIG. 13 is a schematic diagram illustrating a general configuration of the power transmission device according to a variant.

FIGS. 12 and 13 are schematic diagrams showing general configurations of power transmission devices 1B, 1C according to other variants.

In the foregoing embodiment, the communication hole 94 provided in the dividing wall 685 was illustrated as a communication path connecting the first chamber S1 and the second chamber S2.

The communication path need not necessarily be provided in the dividing wall 685. For example, as shown in FIG. 12, it is also possible to use a communication pipe 94B connecting the bottom of the second chamber S2 and the bottom of the first chamber S1.

In the case of the power transmission device 1B using this communication pipe 94B, the first chamber S1 and the second chamber S2 communicate via the communication pipe 94B. By setting the opening area of the communication pipe 94B, the resistance (flow path resistance) as the oil OL passes through the communication pipe 94B, and the flow path cross-sectional area of the communication pipe 94B, the oil OL can be collected in the second chamber S2 to reduce the height of the oil OL in the first chamber S1 while the vehicle V is in motion.

Further, as shown in FIG. 13, it is also possible to use a communication path 94C that connects the first chamber S1 and the second chamber S2 in a thick area of the case 6 (a thick region 615), if there is extra thickness in the case 6.

Even in the case of the power transmission device 1C using the communication path 94C, the first chamber S1 and the second chamber S2 communicate via the communication path 94C. By setting the opening diameter of the communication path 94C, the resistance (flow path resistance) as the oil OL passes through the communication path 94C, and the flow path cross-sectional area of the communication path 94C, the oil OL can be collected in the second chamber S2 to lower the height of the oil OL in the first chamber S1 while the vehicle Vis in motion.

Note that the communication pipe 94B (see FIG. 12) and the communication path 94C (see FIG. 13) may also be applied to the power transmission device 1A (see FIG. 11) described above.

Further, a case has been illustrated in which the communication hole 94 is provided in the bottom of the dividing wall 685, but it is also possible to provide the communication hole 94 in a position offset upwards from the bottom edge of the surrounding wall 681.

For example, it is also possible to provide the communication hole 94 at essentially the same height as the motor unit 932 of the electric oil pump EOP in the direction of the vertical line VL. In this case, at least the motor unit 932 can be submerged in the oil OL collected in the second chamber S2. Therefore, those sections of the electric oil pump EOP that tend to get hot can be appropriately cooled.

In the foregoing embodiment, a case was illustrated in which the power transmission device 1 transmits rotation of the engine ENG to the drive wheels WH, WH, but it is also possible for the power transmission device 1 to transmit the rotation of at least either the engine ENG or the motor (rotary electric motor) to the drive wheels WH, WH. For example, it is possible to use a single-motor, double-clutch power transmission device (in which the motor is arranged between the engine ENG and the power transmission device, a first clutch is disposed between the engine ENG and the motor, and a second clutch is arranged inside the power transmission device 1).

Further, in the foregoing embodiment, a case was illustrated in which the power transmission device 1 has a shifting function, but it is also possible for the power transmission device simply to reduce speed (or increase speed) and not have a shifting function. If the power transmission device does not have a shifting function and instead reduces and transmits rotation of the motor to the drive wheels WH, WH, the oil pressure control circuit for supplying the oil OL for cooling the motor and the oil OL for lubricating the reduction mechanism is arranged in the second chamber S2 with the electric oil pump EOP. Further, in the foregoing embodiment, a case was illustrated in which the control unit of the power transmission device 1 was provided with the control valve CV, but if the power transmission device 1 does not have a shifting mechanism and the drive source is a motor (rotary electric motor) and not the engine ENG, then the control unit may be provided with an inverter or the like for controlling driving of the motor.

Embodiments of the present invention have been described above, but the present invention is not limited only to those aspects shown in the embodiments. The present invention may be modified as deemed appropriate within the scope of the technical concept of the invention.

EXPLANATION OF THE REFERENCE SYMBOLS

1 Power transmission device; 2 Forward-reverse switching mechanism (power transmission mechanism); 3 Variator (power transmission mechanism); 4 Reduction mechanism (power transmission mechanism); 45 Final gear; 5 Differential device (power transmission mechanism); 6 Case; 61 Circumferential wall section; 62 Partition section; 68 Housing section; 681 Surrounding wall; 685 Dividing wall (partition section); 694 Communication hole (communication path); 626, 628 Oil path (flow path); 931 Inverter unit (inverter); 932 Motor unit (motor); 933 Pump unit (pump mechanism); 94 Communication hole (communication path: through-hole); 95 Opening (communication section; T/C Torque converter (power transmission mechanism); WH Drive wheel; HS Housing; MOP Mechanical oil pump (oil pump); EOP Electric oil pump (oil pump); OL Oil; S1 First chamber; S2 Second chamber; and CV Control valve.

The invention claimed is:

1. A power transmission device for a vehicle, comprising:
a housing that accommodates a power transmission mechanism;
a control valve configured to control an oil pressure supplied to the power transmission mechanism;
an oil pump configured to supply oil to the control valve;
a partition section that divides an interior of the housing into a first chamber that accommodates the power transmission mechanism and a second chamber in which the control valve is arranged upright; and
a communication path communicating between the first chamber and the second chamber,
wherein an opening area of the communication path is non-variably set so that an amount of the oil flowing from the second chamber into the first chamber through the communication path is less than an amount of the oil drained into the second chamber from the control valve while the vehicle is in motion.

2. The power transmission device according to claim 1, wherein the housing includes a case having a circumferential wall section surrounding the first chamber, and a housing section having a surrounding wall surrounding the second chamber, wherein the surrounding wall section of the housing section is attached to a side surface of the case on a side of the surrounding wall section toward a front of the vehicle, and a region of the surrounding wall section of the case located toward a boundary between the first chamber and the second chamber constitutes the partition section.

3. The power transmission device according to claim 2, wherein the communication path is a through-hole provided in the partition section.

4. The power transmission device according to claim 3, wherein the through-hole is provided in a position below a height of the oil in the first chamber when the vehicle is not in motion in a direction of a vertical line based on a state of installation of the power transmission device in the vehicle.

5. The power transmission device according to claim 3, wherein a communication section connecting the first chamber and the second chamber is provided in a top section of the partition section.

6. The power transmission device according to claim 1, wherein the oil pump has a motor configured to drive a pump mechanism.

7. The power transmission device according to claim 1, wherein the oil pump has a pump mechanism, a motor configured to drive the pump mechanism, and an inverter configured to control the motor.

8. A power transmission device for a vehicle, comprising:

a housing that accommodates a power transmission mechanism;

a control valve configured to control an oil pressure supplied to the power transmission mechanism;

an oil pump configured to supply oil to the control valve;

a partition section that divides an interior of the housing into a first chamber that accommodates the power transmission mechanism and a second chamber in which the control valve is arranged upright;

a flow path for the oil supplied from the first chamber to the control valve; and a communication path communicating between the first chamber and the second chamber, with an opening area of the communication path being non-variable, wherein a flow path cross-sectional area of the flow path is greater than the opening area of the communication path.

9. The power transmission device according to claim 8, wherein the housing includes a case having a circumferential wall section surrounding the first chamber, and a housing section having a surrounding wall surrounding the second chamber, wherein the surrounding wall section of the housing section is attached to a side surface of the case on a side of the surrounding wall section toward a front of the vehicle, and a region of the surrounding wall section of the case located toward a boundary between the first chamber and the second chamber constitutes the partition section.

10. The power transmission device according to claim 9, wherein the communication path is a through-hole provided in the partition section.

11. The power transmission device according to claim 10, wherein the through-hole is provided in a position below a height of the oil in the first chamber when the vehicle is not in motion in a direction of a vertical line based on a state of installation of the power transmission device in the vehicle.

12. The power transmission device according to claim 10, wherein a communication section connecting the first chamber and the second chamber is provided in a top section of the partition section.

13. The power transmission device according to claim 8, wherein the oil pump has a motor configured to drive a pump mechanism.

14. The power transmission device according to claim 8, wherein the oil pump has a pump mechanism, a motor configured to drive the pump mechanism, and an inverter configured to control the motor.

* * * * *